United States Patent [19]

Boreland

[11] Patent Number: 4,858,163

[45] Date of Patent: Aug. 15, 1989

[54] SERIAL ARITHMETIC PROCESSOR

[75] Inventor: Charles P. Boreland, Waterbury, Conn.

[73] Assignee: General DataComm, Inc., Middlebury, Conn.

[21] Appl. No.: 69,432

[22] Filed: Jul. 2, 1987

[51] Int. Cl.4 .................. G06F 7/00; G06F 11/00; G06F 7/38; G06F 7/52

[52] U.S. Cl. .................. 364/715.03; 364/748; 364/754; 341/50

[58] Field of Search ............ 364/715, 736, 748, 754, 364/715.03, 748.5; 375/33; 235/310; 340/347 DD; 341/50, 81-83

[56] References Cited

U.S. PATENT DOCUMENTS 3,930,232 12/1975 Wallach et al. .................. 235/310
4,700,319 10/1987 Steiner ............................. 364/736

Primary Examiner—Gary V. Harkcom
Assistant Examiner—Dale M. Shaw
Attorney, Agent, or Firm—David P. Gordon

[57] ABSTRACT

A serial arithmetic processor arranged to perform the complex arithmetic functions of the Adaptive Differential Pulse Coded Modulation (ADPCM) algorithm. The serial arithmetic processor includes a first common circuit which is arranged to take advantage of the realization that a large portion of the LOG, FLOAT, and ANTILOG functions can be implemented in common hardware. The serial arithmetic processor further includes a second common circuit which is arranged to take advantage of the realization that large portions of the MULTIPLICATION and FLOATING POINT MULTIPLICATION functions can be implemented in other common hardware. A controller is provided for controlling logic and other circuitry in the first and second common circuits depending upon the desired function to be performed. In addition, a connection of the output of the first common circuit to the input of the second common circuit is preferably provided so that the result of a FLOAT operation can be directly used as the multiplier in a FLOATING POINT MULTIPLICATION operation.

19 Claims, 23 Drawing Sheets

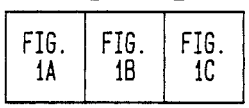
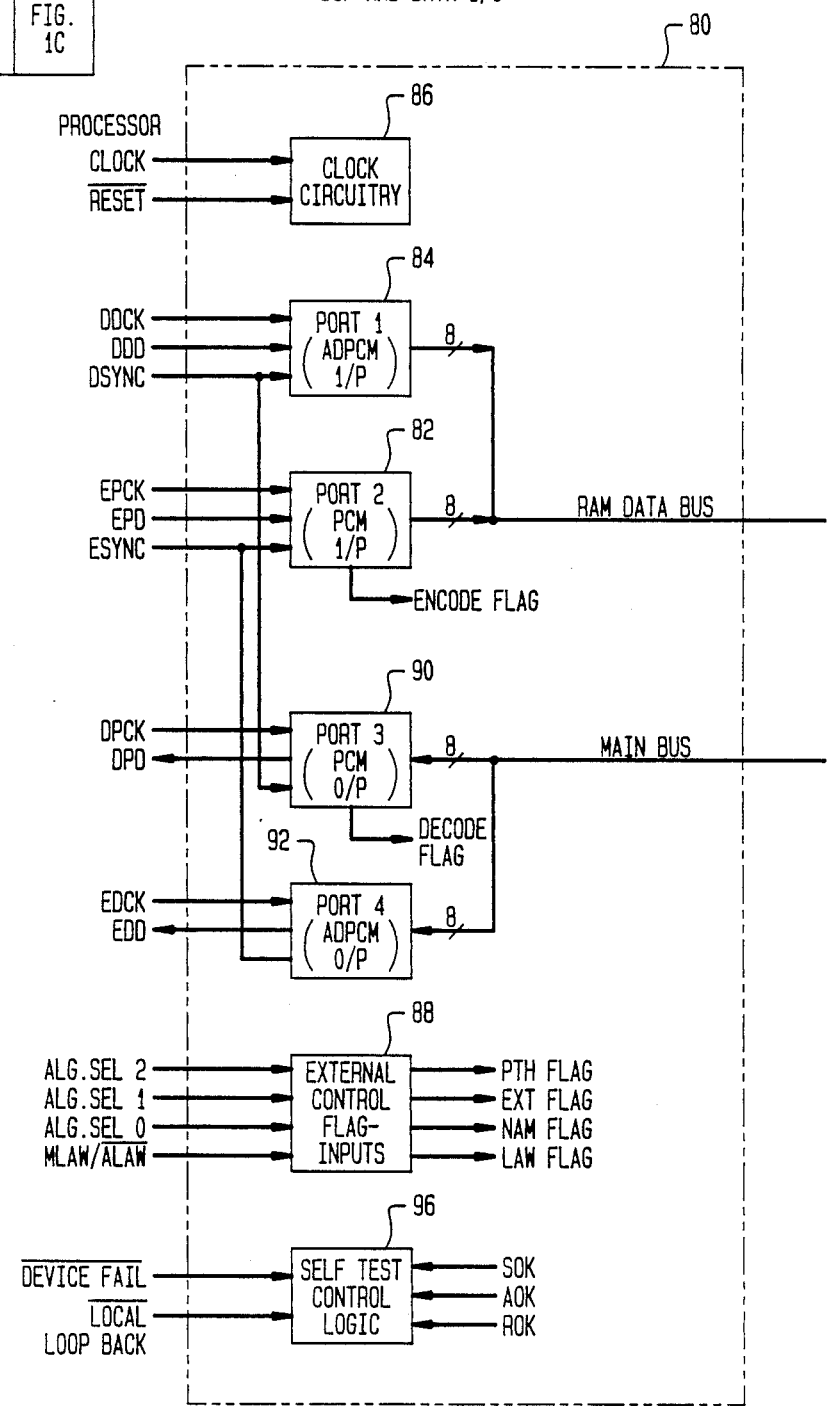
FIG. 1A
BLOCK DIAGRAM OF DSP AND DATA I/O

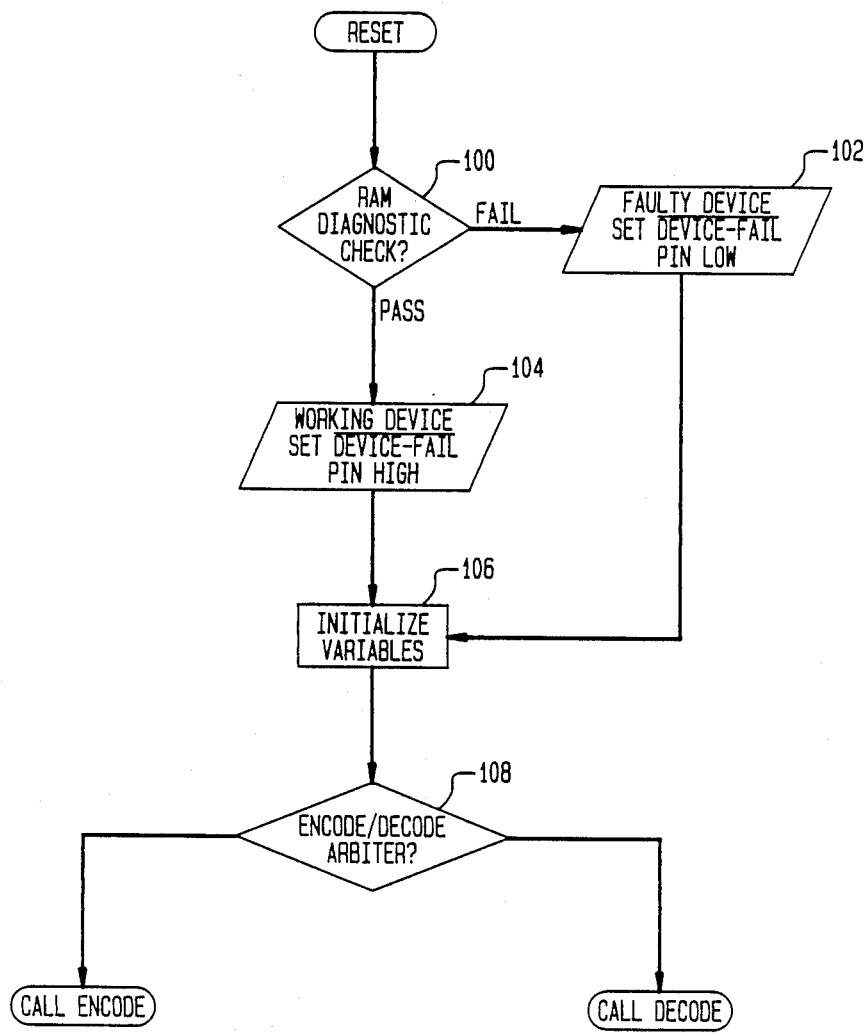

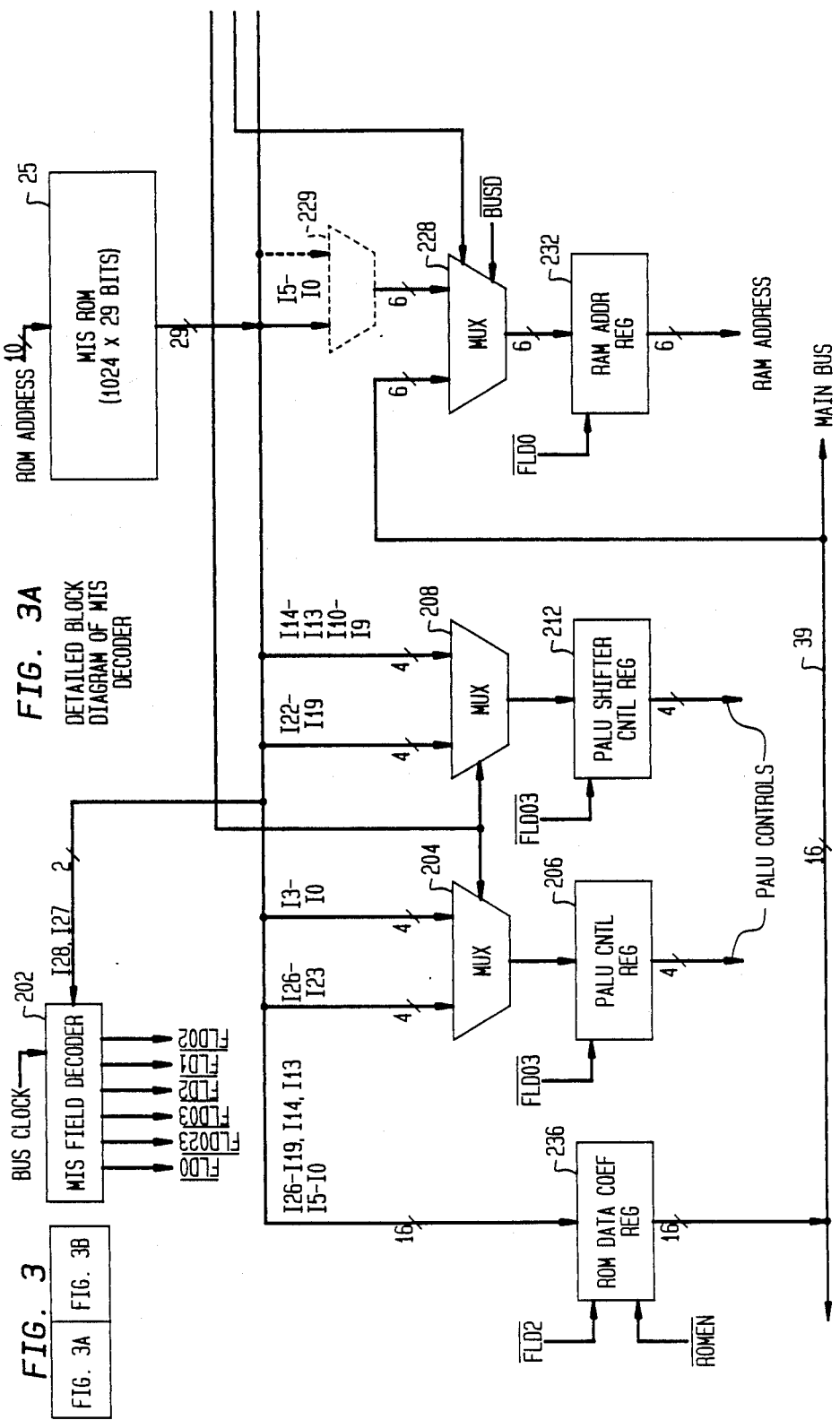
FIG. 3A DETAILED BLOCK DIAGRAM OF MIS DECODER

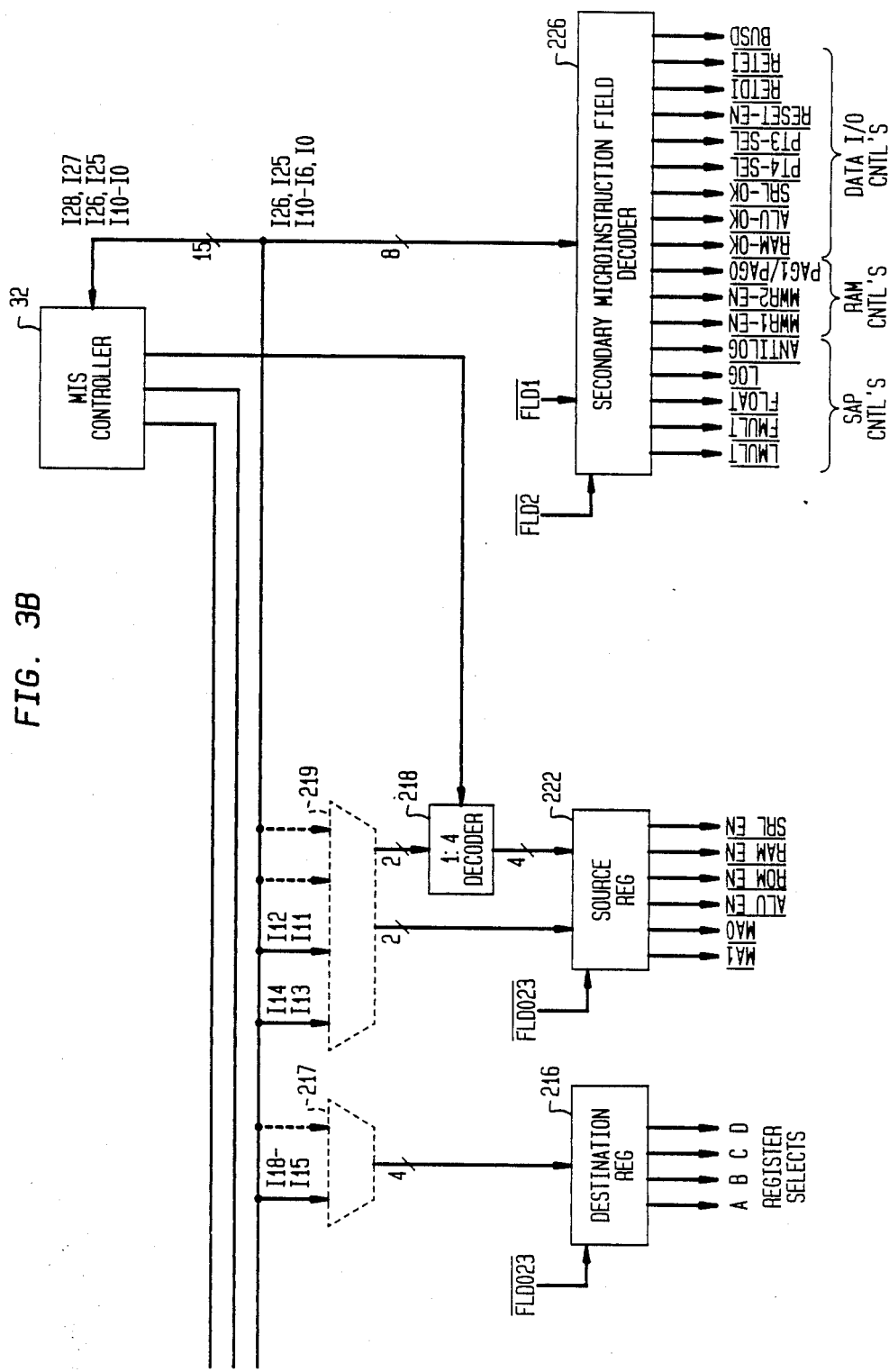

TIMING DIAGRAM FOR MIS SHOWING THE USE OF CONDITIONAL ARITHMETIC MICROINSTRUCTIONS

SIMPLIFIED BLOCK DIAGRAM OF THE
SERIAL ARITHMETIC PROCESSOR (SAP)

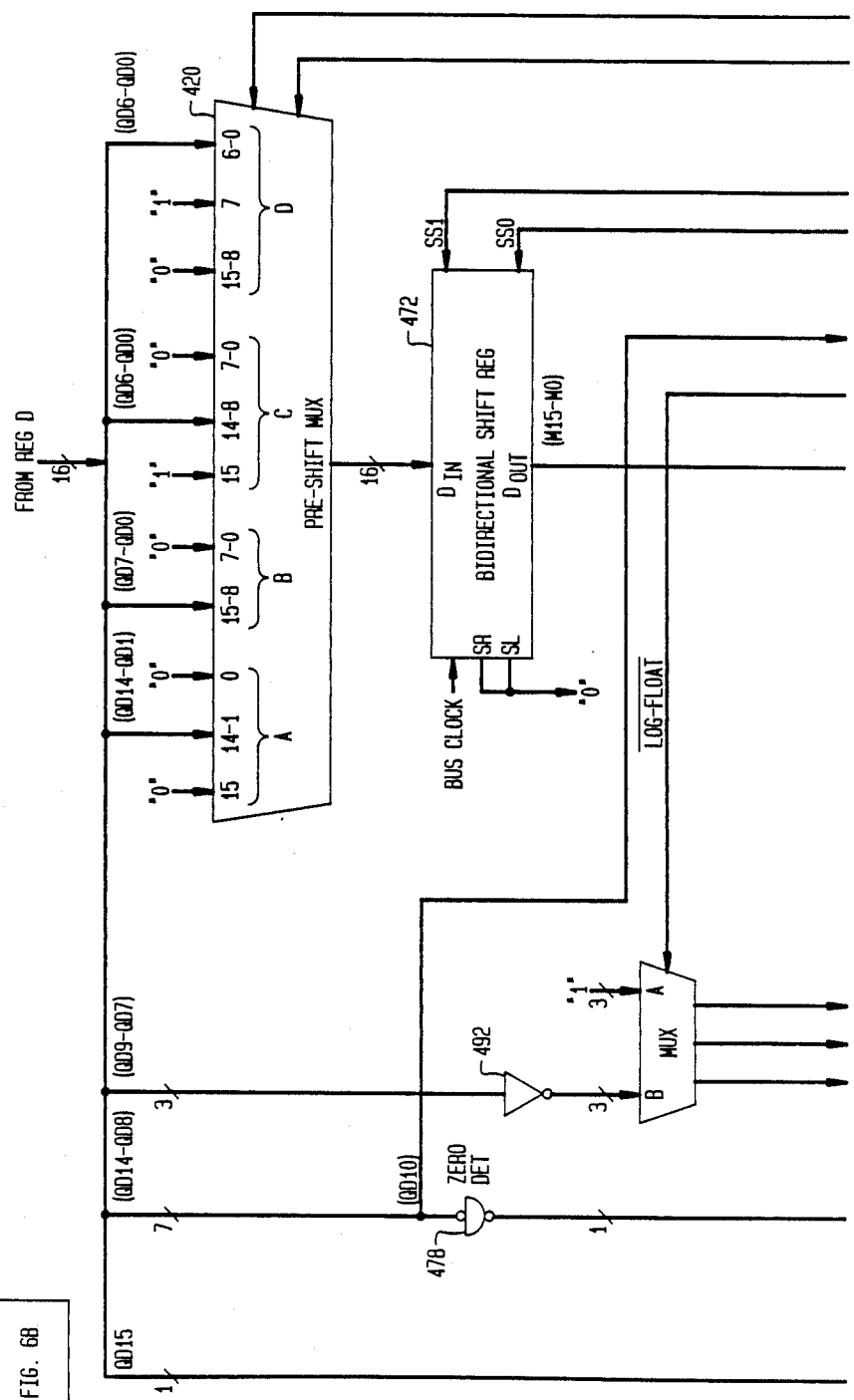

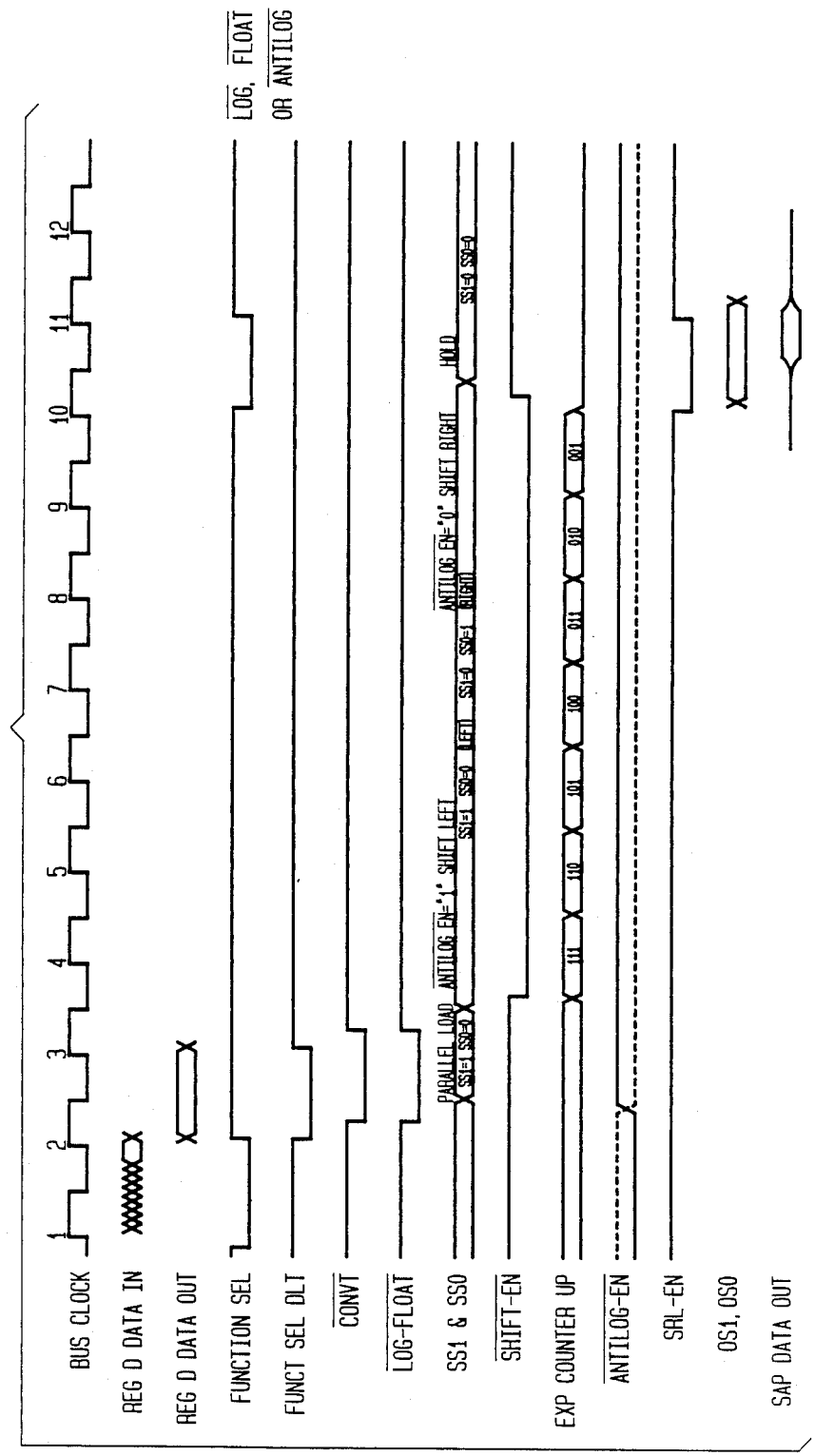

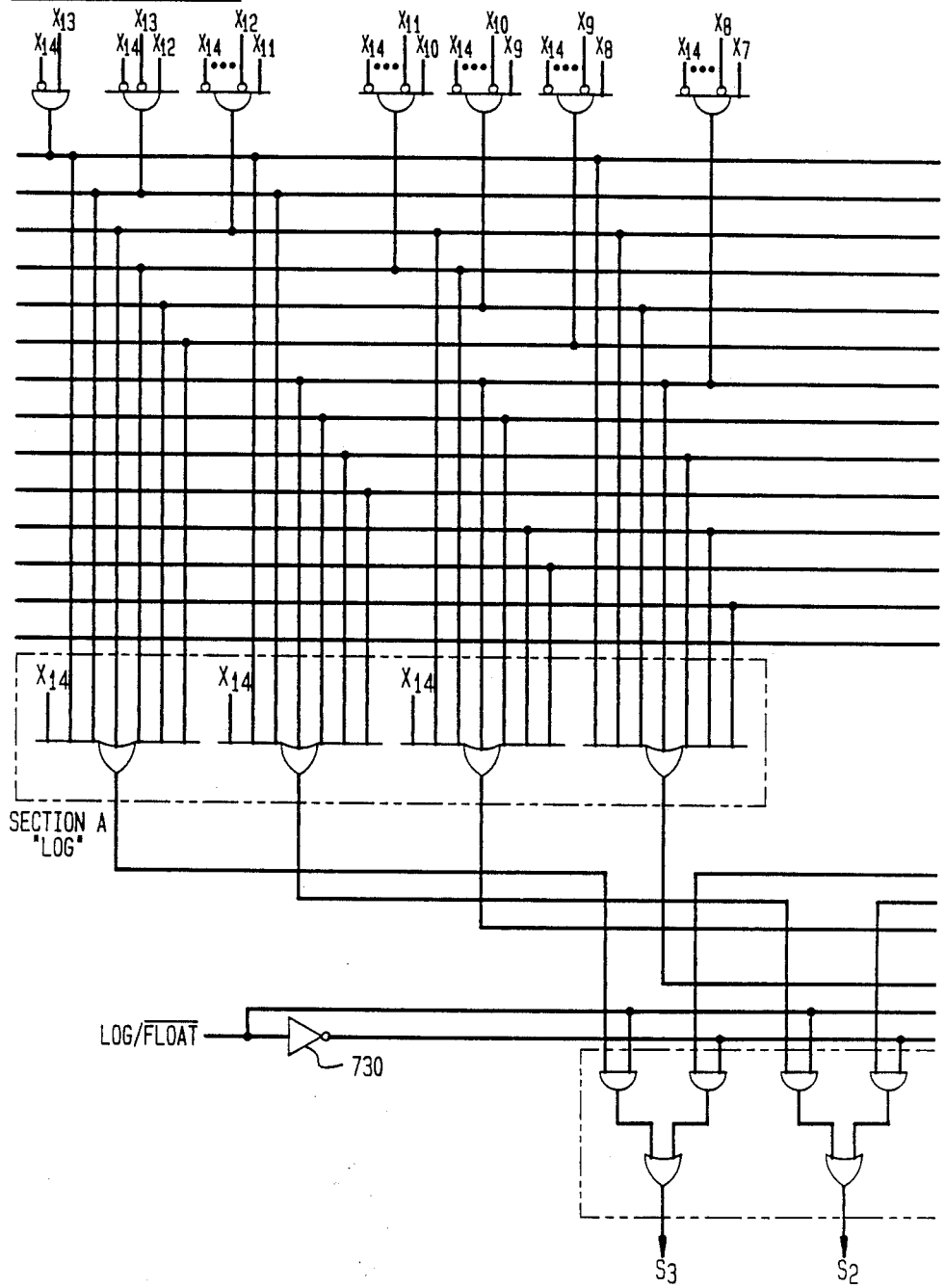

BLOCK DIAGRAM OF SAP SERIAL MULTIPLIER

14 X 8 BIT LINEAR MULTIPLICATION TIMING
(WORST CASE EXECUTION TIME 10 CLOCK CYCLES)

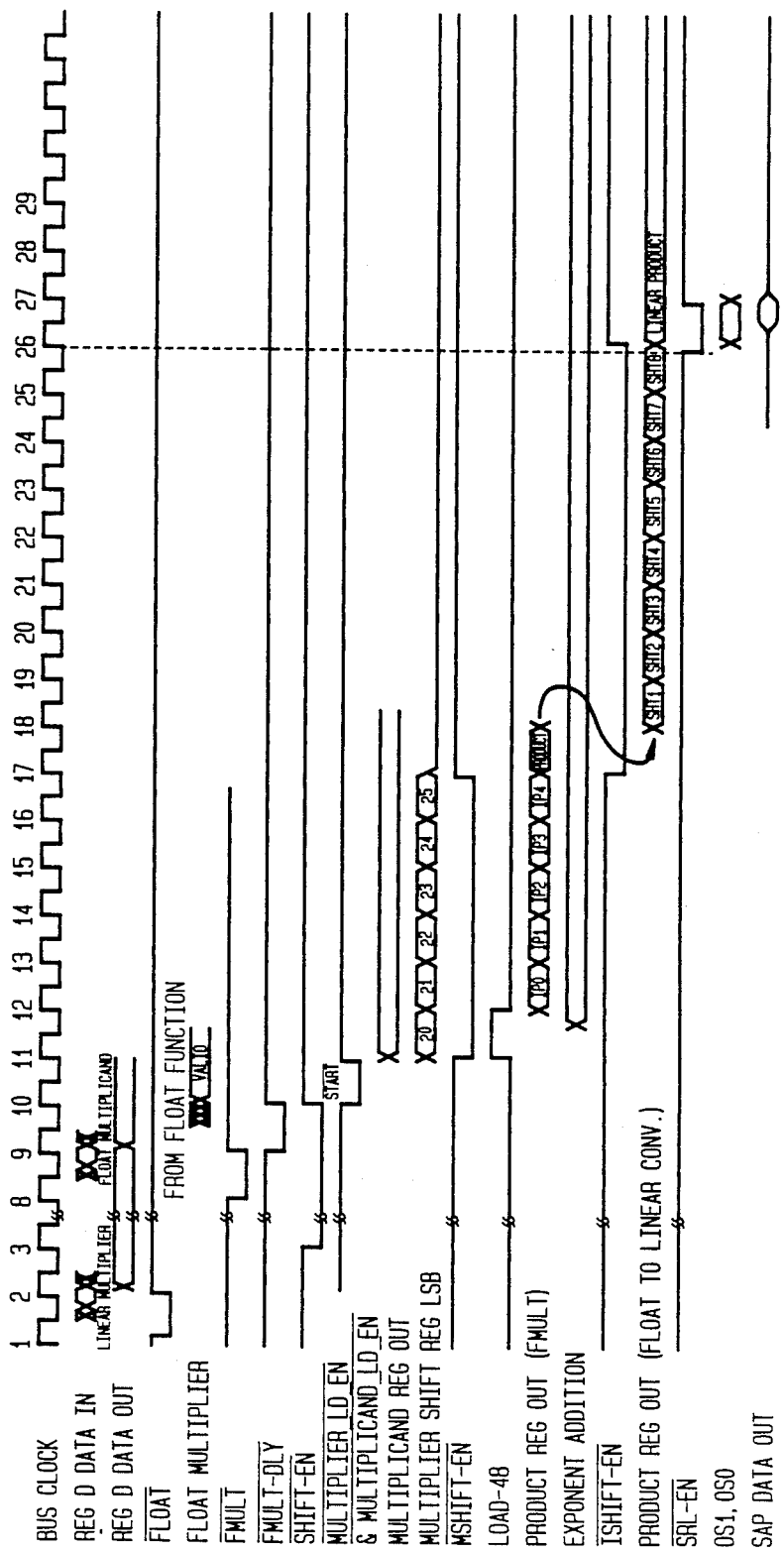

SERIAL ARITHMETIC PROCESSOR

This application is related to commonly-owned, concurrently filed applications entitled "Digital Signal Processor Architecture" U.S. Ser. No. 069,433, "A Microinstruction Sequencer Capable of Instructing Arithmetic, Logical and Data Move Operations in a Conditional Manner" U.S. Ser. No. 069,430, and "Parallel Arithmetic-Logic Unit for Use as an Element of a Digital Signal Processor" U.S. Ser. No. 069,431, all of which are hereby incorporated by reference herein.

BACKGROUND

This invention relates to a serial arithmetic processor which is arranged to perform complex arithmetic functions. The invention more particularly relates to a serial arithmetic processor for adaptive differential pulse code modulation (ADPCM) applications wherein the processor is arranged to efficiently and quickly perform arithmetically complex functions.

Digital encoding of voice channels has long been the standard in the telephonic arts. To provide quality transmission and reproduction, techniques such as pulse code modulation (PCM) at sixty-four kilobits/sec, and differential pulse code modulation (DPCM) have been employed. More recently, the ADPCM technique has been shown to provide advantages in speech encoding by permitting acceptable quality at rates of 32 kilobits/second or less. Indeed, many variations of ADPCM have been proposed as is evidenced by Benvenuto, Nevio, et al., "The 32 KB/S ADPCM Coding Standard" *AT&T Technical Journal*, Vol 65, Issue 5, October 1986 pp 12-22.

In light of the progress made in the area of ADPCM, the CCITT has adopted a recommendation (CCITT Rec. G.721 which is hereby incorporated by reference herein) providing a specified algorithm for the 32 kilobit/second transcoder. Presently, ANSI is considering providing ADPCM standards as may be seen by Draft Standard T1/LB 81, July 23, 1986, which is also hereby incorporated by reference herein.

Regardless of the particular standards or algorithm finally adopted, it is evident that various arithmetic functions must be performed on the voice signals are to provide a high quality ADPCM signal. Thus, a LOG function which converts a sixteen bit unsigned magnitude value into the logarithmic domain; a FLOAT function which converts a sixteen bit signed magnitude value into floating point representation; an ANTILOG function which converts a four bit exponent, seven bit mantissa logarithm into the linear domain; a MULTIPLICATION function for performing fourteen bit by eight bit signed magnitude multiplication; and a FLOATING POINT MULTIPLICATION function for performing a four exponent, six mantissa by four exponent, six mantissa floating point multiplication combined with an output conversion from floating point to signed magnitude; are all required by all ADPCM algorithms (See Sections 6.4.2.2, 6.4.2.3, 6.4.2.4, and 6.4.2.6 of Draft Standard T1/LB 81).

Those skilled in the art are well aware that the above-listed arithmetic functions are not found in the instruction sets of the digital signal processing microchips presently available. Thus, in implementing the ADPCM algorithm, it has become standard to provide software routines to perform the arithmetically complex functions. However, such software programs have proved burdensome, both in their requirement for large microcode storage, and the execution time required for accomplishing the program.

SUMMARY OF THE INVENTION

It is therefore an object of the invention to provide a serial arithmetic processor for performing arithmetically complex functions.

It is a further object of the invention to provide a serial arithmetic processor with can quickly perform the arithmetically complex functions required in ADPCM in an efficient manner.

It is another object of the invention to provide a serial arithmetic processor which uses common means for performing large segments of various arithmetically complex functions.

It is yet another object of the invention to provide a serial arithmetic processor which uses common means to perform large segments of the LOG, FLOAT, and ANTILOG functions, and the output of the common means along with another common means to perform large segments of the MULTIPLICATION and FLOATING POINT MULTIPLICATION functions.

In accord with the objects of the invention, a serial arithmetic processor for performing arithmetically complex functions on data including LOG, FLOAT, ANTILOG, FLOATING POINT MULTIPLICATION and signed magnitude MULTIPLICATION basically comprises:

(a) first common means for performing the LOG, FLOAT and ANTILOG functions on the data, including controllable first logic and circuit means;

(b) second common means for performing the FLOATING POINT and signed magnitude MULTIPLICATION functions on the data, including controllable second logic and circuit means;

(c) means for connecting the output of said first common means to said second common means to permit the use of the FLOAT output of said first common means in the performing by the second common means of the FLOATING POINT MULTIPLICATION function;

(d) output means for receiving processed data from said first and second common means and sending the processed data in a desired format and order to a desired destination; and (e) controller means for controlling said controllable first and second logic and circuit means, said connecting means, and said output means as a function of the desired function to be performed on incoming data.

Preferably, the first common means employs a shifter as the performance each of the LOG, FLOAT, and ANTILOG functions each may be implemented through shifting bits. Also, preferably, the connecting means under the control of the controller permits the FLOATING POINT MULTIPLICATION function to be carried out expeditiously, as the first common means and second common means may be operated concurrently such that the second common means obtains the results of the FLOAT operation from the first common means at an advantageous time in the calculation cycle.

A better understanding of the invention, and additional advantages and objects of the invention will become apparent to those skilled in the art upon reference to the detailed description and the accompanying drawings.

BRIEF DESCRIPTION OF THE DRAWINGS

FIGS. 2a–2e are top level flow diagrams for accomplishing the ADPCM algorithm with the DSP of FIG. 1;

FIG. 3 shows the interconnection of FIGS. 3A and 3B, which are a block diagram of the microinstruction decoder of the microinstruction sequencer of the digital signal processor of FIG. 1;

FIG. 7 is a timing diagram of the first common means of FIG. 6;

FIG. 10b is a timing diagram for the second common means of FIG. 9 for carrying out a floating point multiplication.

DETAILED DESCRIPTION OF THE PREFERRED EMBODIMENT

Figure 1B:
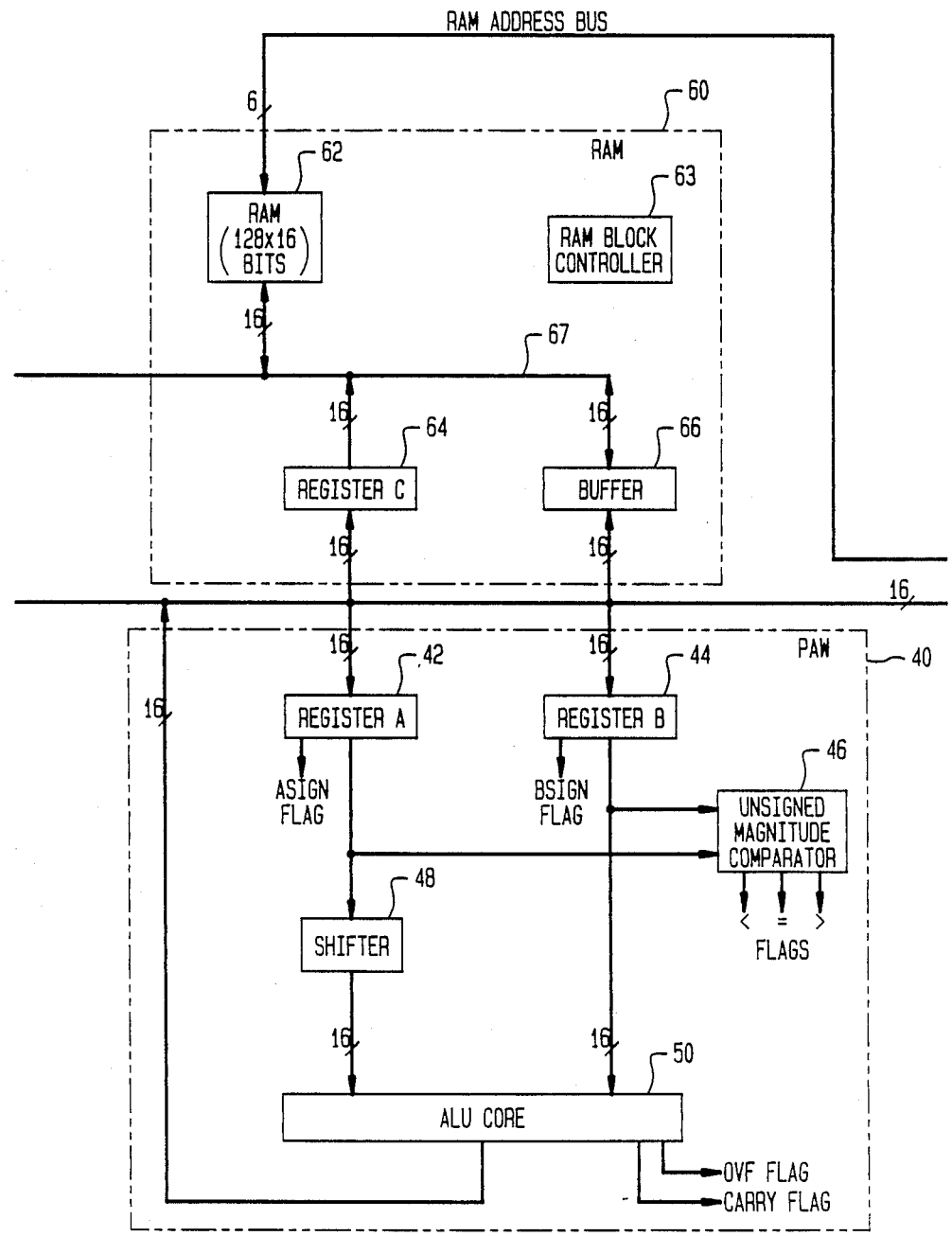
FIG. 1 shows the interconnection of FIGS. 1A–1C, which are a block diagram of a digital signal processor in conjunction with an I/O section of the VLSI on which the digital signal processor is implemented.
Figure 1C:
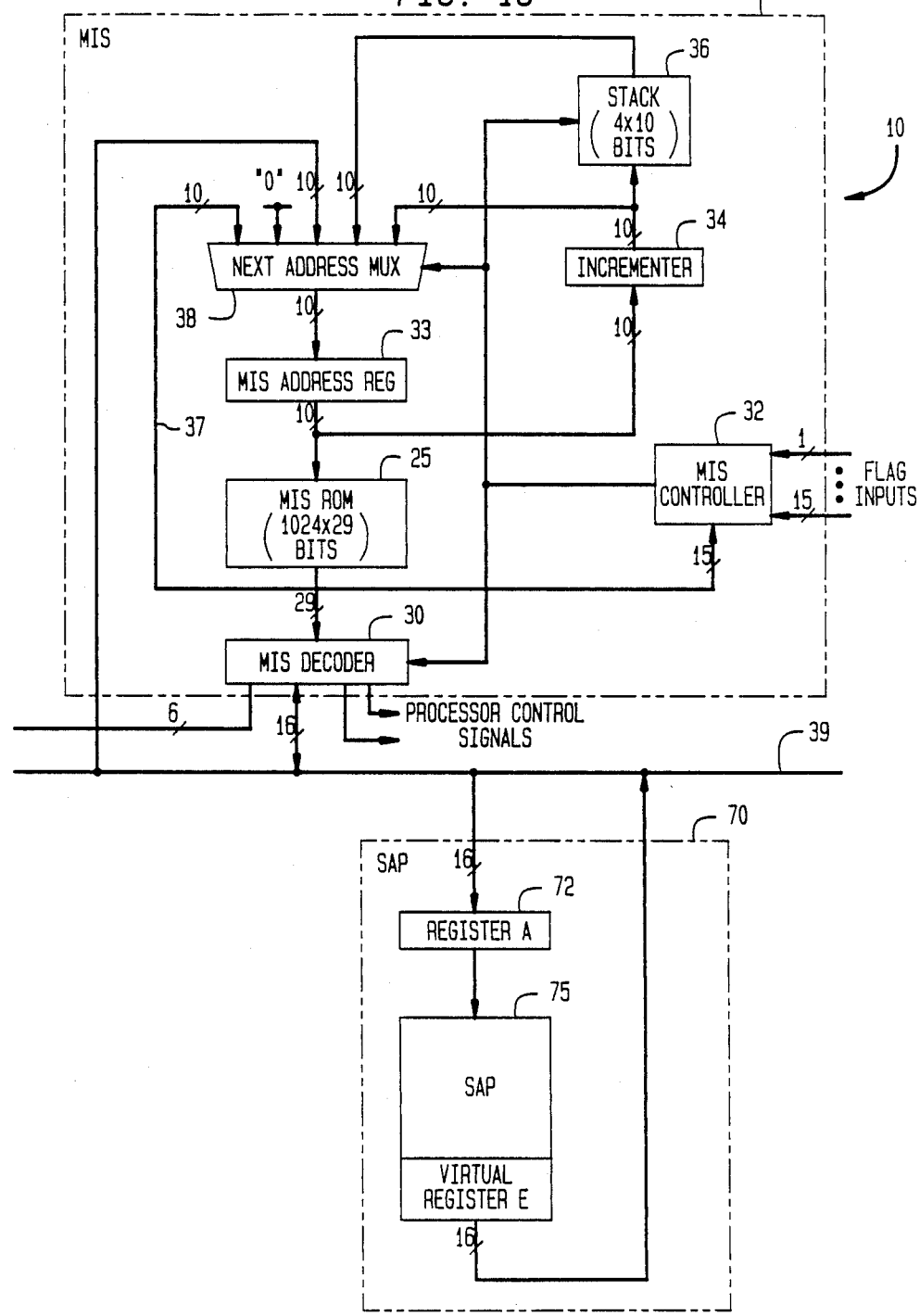
Figure 2B:
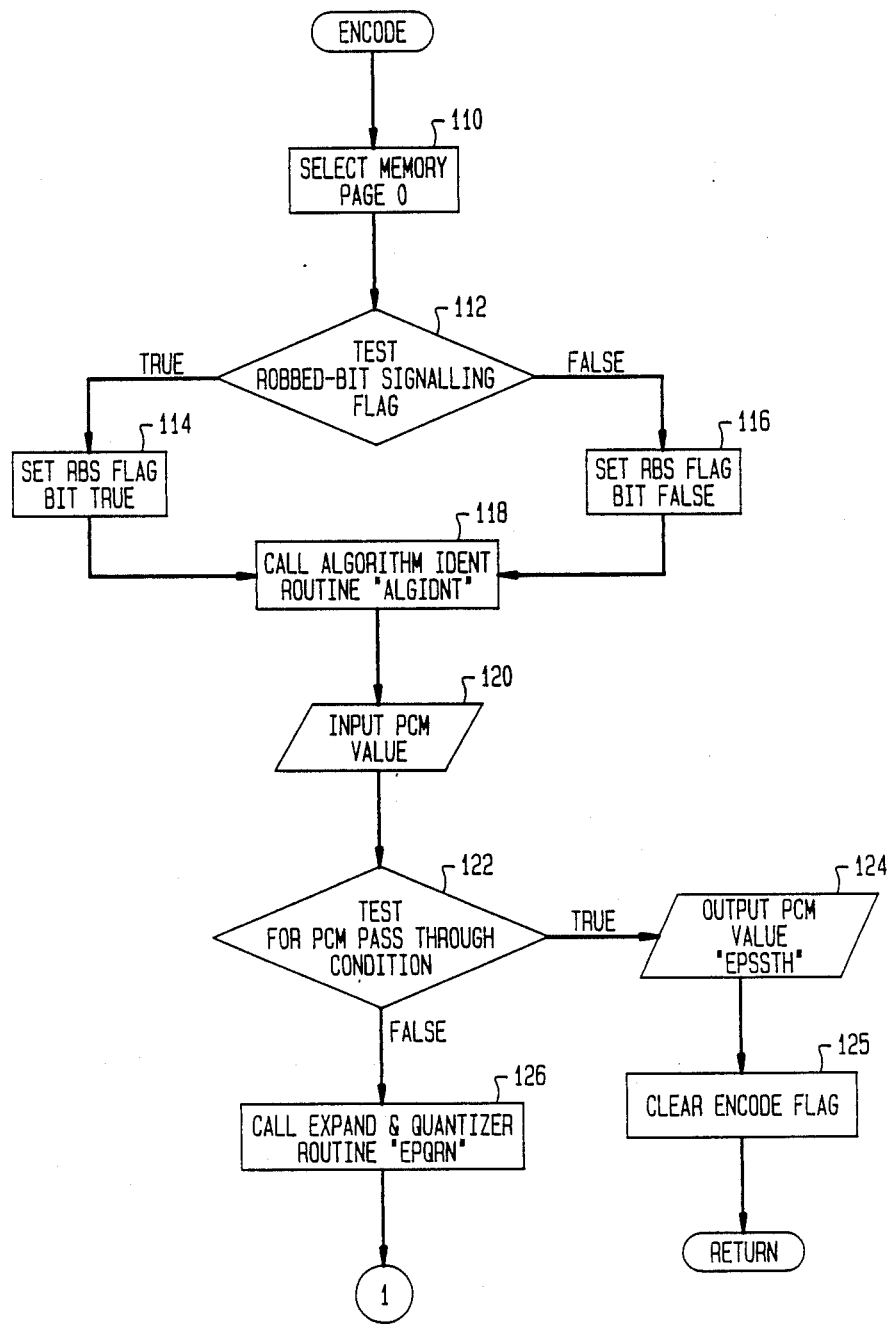
Figure 2C:
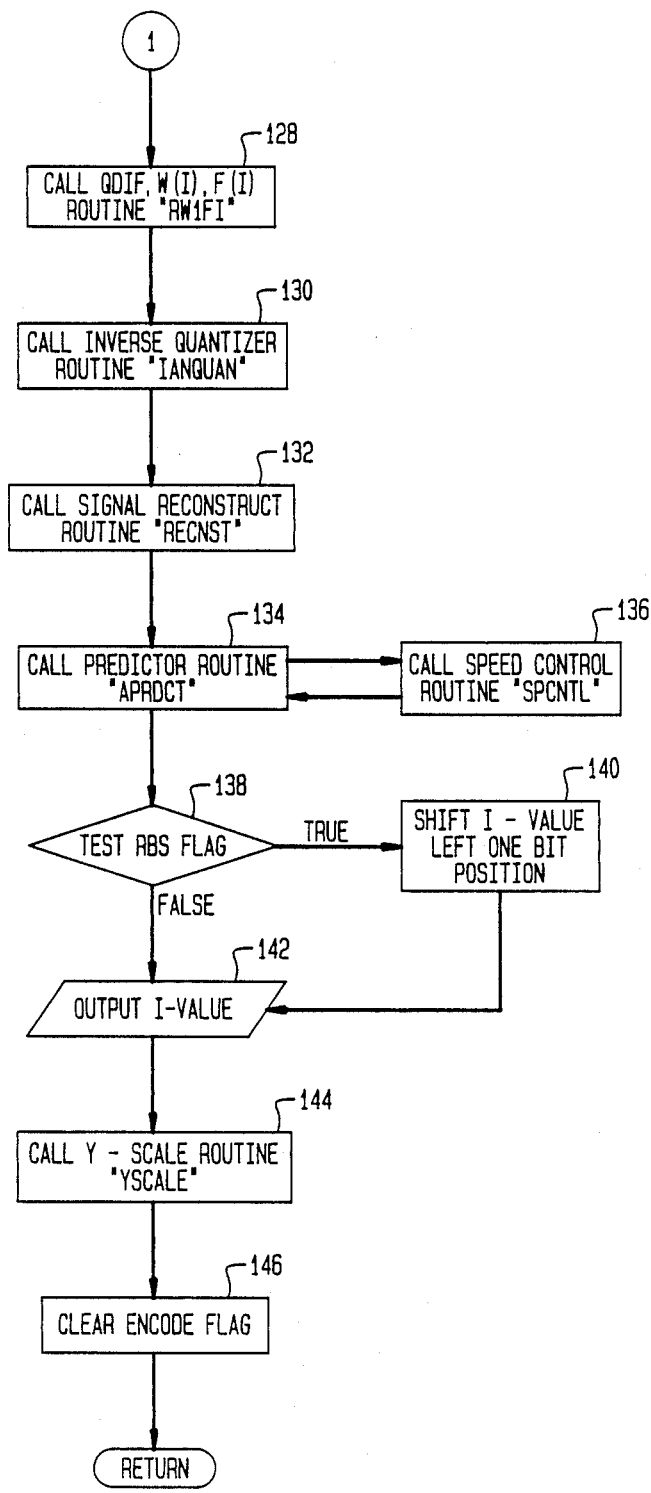
Figure 2D:
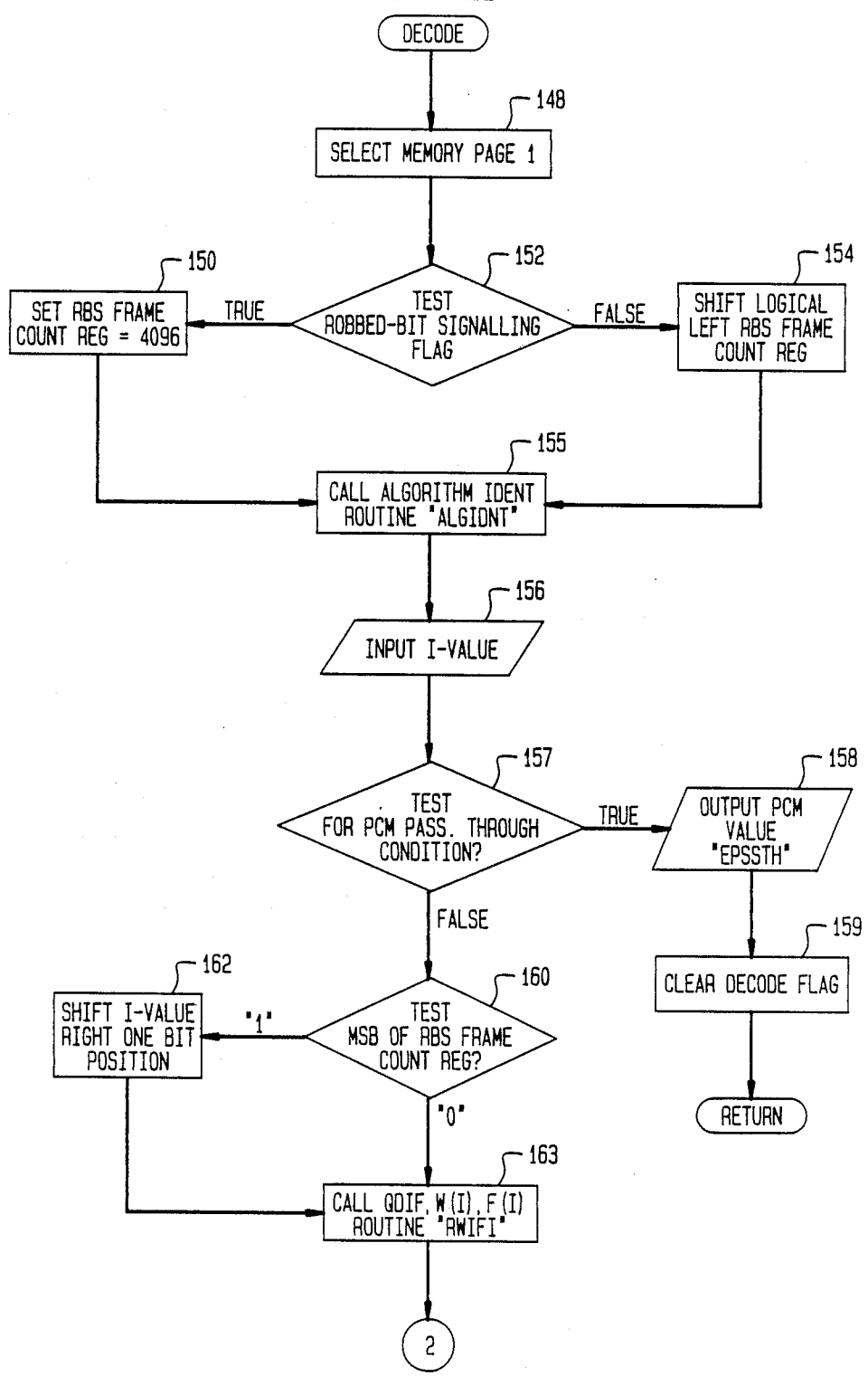
Figure 2E:
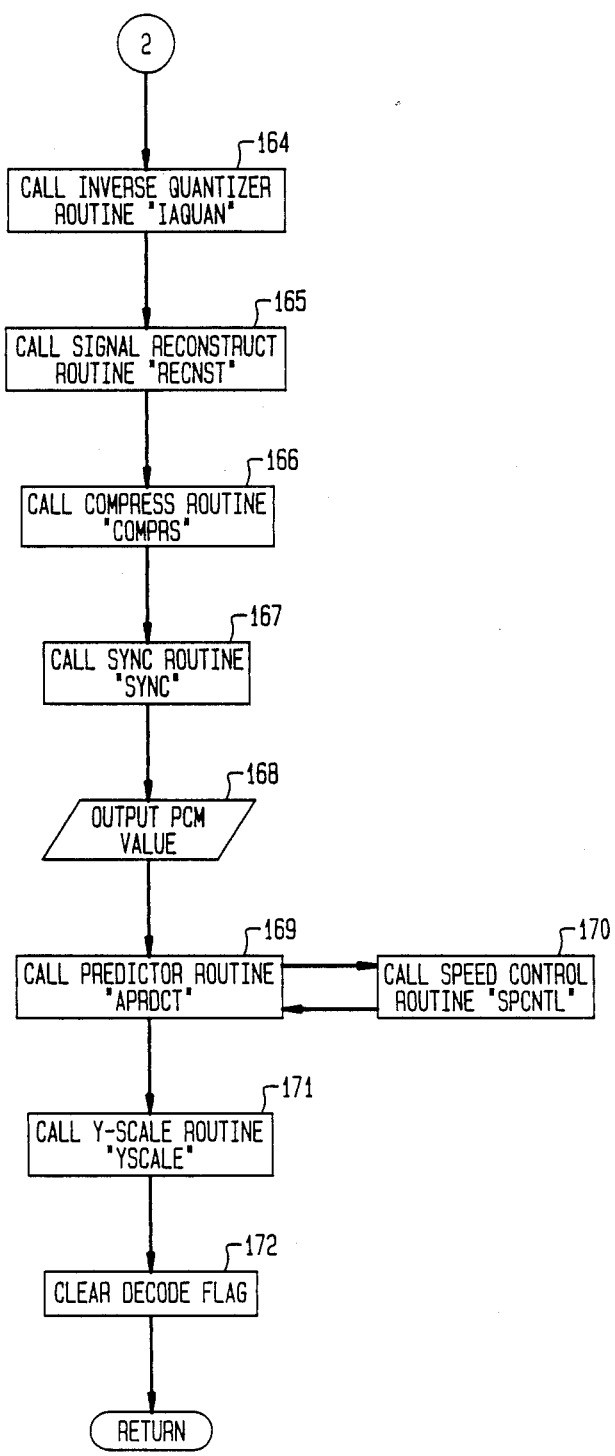
Figure 4:
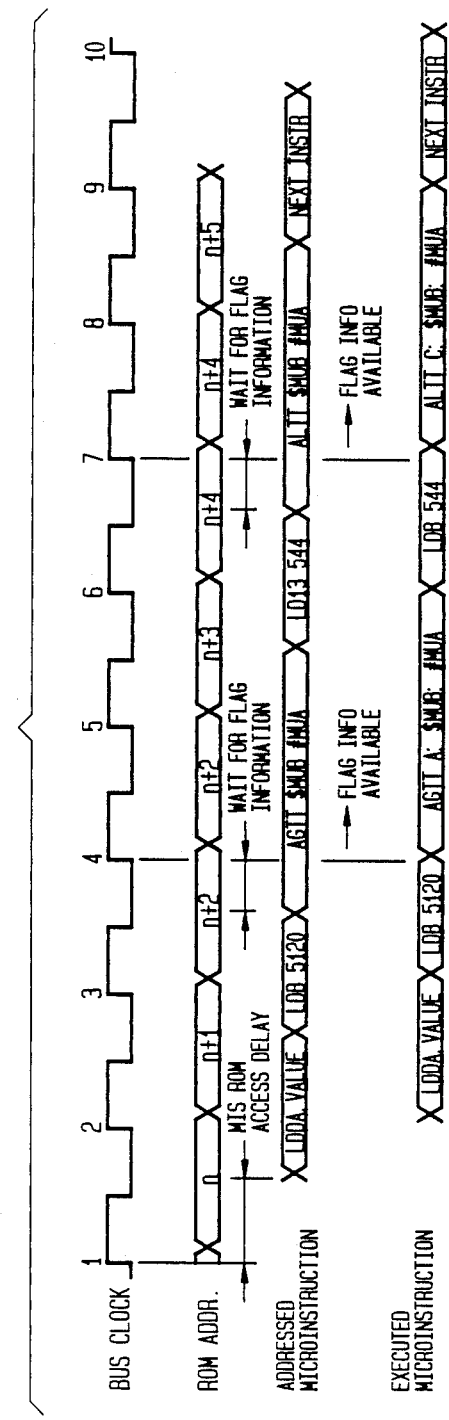
FIG. 4 is a timing diagram for the microinstruction sequencer of the digital signal processor of FIG. 1.
Figure 5:
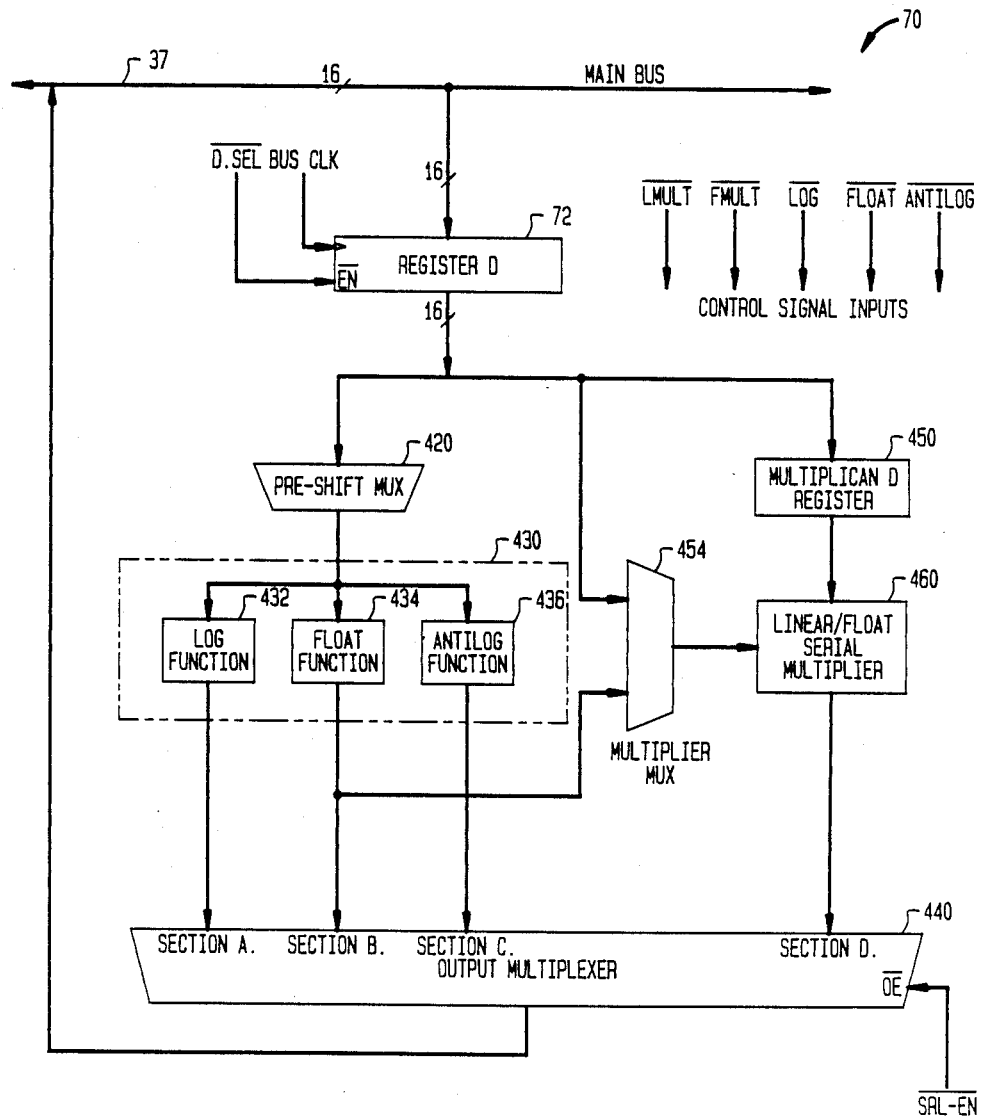
FIG. 5 is a simplified block diagram of the serial arithmetic processor of the digital signal processor of FIG. 1.

Turning to FIG. 5, a simplified block diagram of the serial arithmetic processor 70 capable of performing the LOG, FLOAT, ANTILOG, MULTIPLICATION, and FLOATING POINT MULTIPLICATION functions on incoming data as is required by the ADPCM algorithm is seen. Typically, a sixteen bit word is received by the processor 70 via a data bus, and the sixteen bits are stored in a register 72 (Register D). Depending on the various control signals received, and in accord with a clock signal, the contents of the register 72 are sent via a pre-shift multiplexer 420, to a first common means 430, or to the multiplier means 460 via a multiplicand register 450 or a multiplexer 454. Thus, if the contents of the register 72 are to be processed according to the LOG, FLOAT, or ANTILOG functions, a first common means 430 is loaded via the pre-shift multiplexer 420. On the other hand, if a MULTIPLICATION function is to be accomplished, the common multiplier 460 is loaded with the multiplier via the multiplexer 454 and the multiplicand register 450 is loaded with the multiplicand. As will be described in detail hereinafter, if a FLOATING POINT MULTIPLICATION is to be carried out, the multiplier must first be processed by the float converter 434 prior to being sent via multiplexer 454 to the common multiplier 460 (the multiplicand typically having already undergone such a conversion and being stored in a floating point format).

Figure 6B:
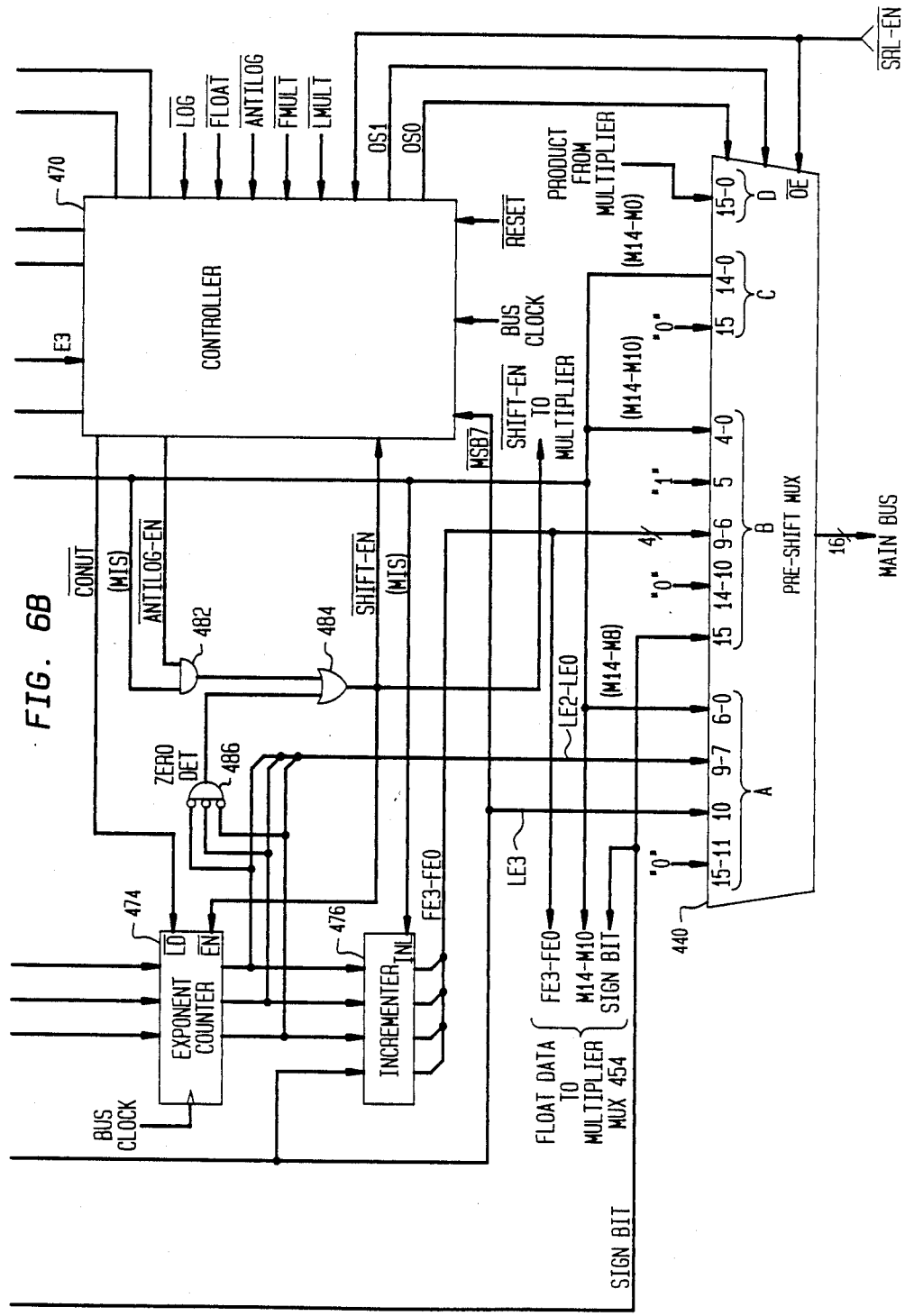
FIG. 6 which shows the interconnection of FIGS. 6A and 6B, which are a block diagram of the first common means of the serial arithmetic processor of the digital signal processor of FIG. 1.

The manner in which data coming from the register 72 is pre-shifted by the pre-shift multiplexer 420 depends on control signals provided to the pre-shift multiplexer by a controller 470 seen in FIG. 6. The function of the data pre-shift multiplexer is to format the data via parallel bit selection so that common means can properly process the data to provide any of the required functions. Thus, the formatted data will be loaded into a first common means 430, which performs either a LOG, FLOAT, or ANTILOG function on the data as is suggested by boxes 432, 434, and 436. The particular manner in which the data is pre-shifted data is dependent on the function to be accomplished, and the pre-shift multiplexer 420 accomplishes the same under the control of the control signals. If the LOG 432 or ANTILOG 436 functions are utilized, the processed data is then sent out of the serial processor 70 via an output multiplexer 440 which formats the processed data. If the FLOAT 434 function is utilized, the processed data is output via output multiplexer 440 if the data undergoing the FLOAT function is not being used as the multiplier of a FLOATING POINT MULTIPLICATION. If the data undergoing the FLOAT function 434 is the multiplier of a FLOATING POINT MULTIPLICATION function, the processed floating point multiplier data is sent via multiplexer 454 to serial multiplier 460 such that it can be multiplied with the floating point multiplicand contained in register 450.

With either of the multiplication functions, the multiplicand register must be loaded with one word of data (the multiplicand) while a multiplier shift register of the multiplier 460 is loaded with a second word of data (the multiplier). The MULTIPLICATION and FLOATING POINT MULTIPLICATION functions may then be carried out by the second common (multiplier) means 460 which forwards the results to output multiplexer 440. However, as above-stated, in the FLOATING POINT MULTIPLICATION the multiplicand and multiplier are first converted via the FLOAT function in first common means 430 prior to being processed by second common means 460. Thus, a first word of data is processed by the first common means 430 to provide a floating point multiplicand which may be reentered into register 72 and stored in multiplicand register 450. A second word (the multiplier data) is then similarly processed. However, instead of reentering the information in register 72, the floating point multiplier is sent directly to the multiplier common means 460 via the multiplexer 454.

Before turning to FIG. 6, it is instructive to review the manner in which log conversions (LOG function), floating point conversions (FLOAT function), and antilog conversions (ANTILOG function) are accomplished algorithmically. In a log conversion (LOG), in accord with the ADPCM standards, an approximation is obtained by setting the integer part of the log equal to the exponent of the base two linear number (i.e. the digit of the left-most "1"), and setting the fractional part of the log (mantissa) equal to the remaining digits of the unsigned magnitude number. For example, if a unsigned number N is set as follows:

0 0 0 0 0 0 0 0 0 0 0 1 1 1 0 1

-continued

| $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
|---|---|---|---|---|---|---|---|---|---|---|---|---|---|---|---| it is readily seen that the digit having the left-most "1" value is the $2^4$ digit. The integer part of the log which is four bits long to accommodate all possible values in the sixteen bit word is therefore set to 0100 which is equal to the exponent value 4. The fractional part of the log which is preferably seven bits long is then set to the remaining digits with additional zeroes: i.e. 1101000. The log value for N is seen as the combination of the exponent and the mantissa: 0100.1101000.

The log value for N may also be described and obtained by the following algorithm for a fifteen bit unsigned magnitude number:

$$EXP = \begin{cases} 14 & \text{where } 16384 <= N \\ 13 & \text{where } 8192 <= N <= 16383 \\ . \\ . \\ 1 & \text{where } 2 <= N <= 3 \\ 0 & \text{where } 0 <= N <= 1 \end{cases}$$

$$MANT = ((N << 7) >> EXP) \text{ AND } 127$$

Thus, LOG (N)=EXP <<7 OR MANT, where << means shift left and >> means shift right. In finding the mantissa where the number N is shifted left by seven places and then shifted right by the number of places defined by the exponent value, with the resulting digits then being processed via a logical AND with the value 127 (1111111), it should be noted that the shifting occurs by originally placing the fractional point to the right of the $2^0$ digit and then shifting. Thus, after shifting N left by seven places, the number appears as 111010000000. After shifting right by four places, the number appears as 11101000. Using a logical AND with 01111111, the value 01101000 or 1101000 is derived. It will be appreciated by those skilled in the art that the effect of using a logical AND of 01111111 with a supplied number is to nullify the exponent defining bit while permitting the bits following the exponent defining bit to maintain their values.

The FLOAT operation is similar in some respects to the LOG operation. Four bits are used to define the exponent, and the exponent value is set equal to the LOG exponent plus one, except for the case where the number is zero, and the exponents take the same zero value. The format of the mantissa differs significantly, however, as only six bits are required for the mantissa, and the mantissa value is essentially a truncated portion of the number itself.

The algorithm for obtaining a floating point value for a sixteen bit signed magnitude linear number is as follows:

$$SGN = N >> 15$$

$$MAG = N \text{ AND } 32767$$

$$EXP = \begin{cases} 15 & \text{where } 16384 <= MAG \\ 14 & \text{where } 8192 <= MAG <= 16383 \\ . \\ . \\ 2 & \text{where } 2 <= MAG <= 3 \\ 1 & \text{where } MAG = 1 \\ 0 & \text{where } MAG = 0 \end{cases}$$

$$MANT = \begin{cases} 1 << 5 & \text{IF } MAG = 0 \\ (MAG << 6) >> EXP & \text{otherwise} \end{cases}$$

Thus, FLOAT (N)=SGN<<15+EXP<<6+MANT. Using the number 1000000000011101 (−29 in signed decimal), the FLOAT function may be obtained by first recognizing that the value of the number N is 29. The exponent would therefore be set to five (one greater than the base two position of the first "1" bit), or 101 in base two. With the exponent so set, the mantissa is determined by shifting the number left by six positions: 11101000000, and then by shifting right by the value of the exponent (5): 111010. The FLOAT number is set to the OR value of the following numbers:
SGN=1000000000000000
EXP=101000000
MANT=111010
such that the final number is 1000000101.111010. Those skilled in the art will appreciate that the original number 11101 (N) remains intact in the floating point representation as the purpose of the floating point representation is to essentially normalize the number N. The exponent is used to accomplish that normalization. It will also be appreciated that by shifting the number N left six places and then right by the value of the exponent, a mantissa of six bits in length containing the number N starting at its most significant will be obtained.

The ANTILOG function (log domain to linear domain conversion) is basically the inverse of the LOG function. The exponent value is determined, and a logic "1" is inserted into the bit position (two to the power of the exponent value) corresponding thereto. The mantissa is then positioned into the bit positions to the right of the bit position defined by the exponent. For example, the ANTILOG function of the log value 0100.1101000 is determined as follows: The exponent value 0100 is equivalent to the number four. Thus, a "1" is put in the two to the fourth bit position, and the mantissa 1101000 (or as much as will fit in the word) is located thereafter. The linear value becomes 0000000000011101. Reference to the LOG algorithm above shows that the same linear value produced the log value 0100.1101000 which was the starting value of this ANTILOG calculation.

Turning to FIGS. 6 and 7, a block and timing diagram of the first common means which contains circuitry for performing the LOG, FLOATING POINT, and ANTILOG functions is seen. The common means generally comprises a controller 470, and a bidirectional shift register 472. In the implementation of FIG. 6, a counter 474, an incrementer 476, and a zero detector 478 are all included for expeditiously determining exponent values for the LOG and FLOAT functions and for helping control the shift register in the ANTILOG function. In addition, a pre-shift multiplexer 420 is used to pre-shift the incoming data bits so as to expedite the execution of the functions.

The controller 470 of the common means 430 controls the pre-shift multiplexer 420 and other elements of the first common means 430, and is controlled itself by software for providing the processing of data according to the ADPCM algorithm. In particular, the controller 470 outputs two controlling select bits (IS1 an IS0) to the pre-shift multiplexer as a function of the particular function (LOG, FLOAT or ANTILOG) to be performed as well as a function of the zero detector 478 hereinafter described (and the msb of the log exponent E3 during the ANTILOG conversion). The control bits IS1 and IS0 direct data in register 72 though the proper sections of the pre-shift multiplexer 420 so that the data may be properly preprocessed (pre-shifted) to permit the functions to be expeditiously performed. Thus, as will be described in more detail hereinafter, if a LOG or FLOAT function is to be performed, the sixteen bits are preprocessed in sections A or B of the pre-shift multiplexer. If, on the other hand, an ANTILOG function is to be performed, the bits are preprocessed in sections C or D of the data pre-shift multiplexer 420. As will be appreciated from FIG. 6, the data being loaded in register D 72 is preferably in coordination with the control selects of the LOG, FLOAT, or ANTILOG functions of the controller 470. In this manner, by the time of the next clock cycle, the pre-shift multiplexer 420 will have received control information (IS1 and IS0) from the controller so that it will know how to preprocess the data. The control selects, however, may be applied at some time later after register D 72 has been loaded. In this case, the LOG, FLOAT, or ANTILOG functions will not begin until the application of the appropriate control select.

Two additional control bits (SS1 and SS0) from the controller 470 are used to direct the bidirectional shift register 472 to shift left or right, to hold or to load. Thus, in performing a FLOAT function, it is imperative to determine the location of the left-most bit with a value of "1". One manner of making the determination is by presetting a counter such as counter 474 to the value fifteen, and decrementing the counter each time the sixteen bit number (the msb being the sign bit and not being used for this determination) is shifted one place to the left. The shift decrement operation is then repeated until a logic 1 appears in bit position fifteen of the shift register. The value of the counter 474 is then taken to correspond to the exponent value.

The preferred manner of determining the location of the left-most bit with the value of "1" is to logically OR the seven most significant bits (excluding the sign bit) of the sixteen bit word, as at 478 of FIG. 6. If the result of the logical OR provides a "1", it is known that the left-most logic 1 appears in bits eight through fourteen. If the result of the logical OR 478 is a "0", it is known that the left-most logic "1" appears in bits zero through seven. In this manner, the number of shift cycles is reduced as the sixteen bit word may be preshifted (using the data pre-shift multiplexer 420) by eight bit positions to the left when the OR gate value is "1". Regardless, the output of zero detector 478 is sent to controller 470 (as MSB7) so that the proper pre-shifting and shifting decisions may be undertaken at the data format multiplexer 420 and shift register 472.

Finally, with regard to the controller 470 control signals, the controller outputs output select signals OS1 and OS0 to control the output multiplexer 440 in conjunction with the serial processor output enable signal SRL-EN generated externally of the serial processor. As will be discussed hereinafter, the output select signals permit the processed data to be properly formatted (i.e. post-processed) for output to a desired location.

In accord with FIGS. 6 and 7, the timing and flow of data for performing the LOG, FLOAT, and ANTILOG functions is as follows. During the first cycle, the selection of the LOG, FLOAT or ANTILOG function is accomplished by using external means (e.g. a microinstruction sequencer) to signal the controller 470. At the end of a first cycle, data is loaded in register 72 (Register D) which is selected by the external means. When the external means determines that a function is to be performed, the contents of Register D are sent to the bidirectional shift register 472 via the pre-shift multiplexer 420 by the end of the second cycle. Also, during cycle two, the counter 474 is loaded with an appropriate value (seven [15 bits — preshift of 8 bits] for the LOG or FLOAT operations, or the inverse value of the three least significant bits of the ANTILOG exponent). Cycles three through nine are used to shift data in the shift register and to decrement the counter 474 until the shift enable input into the controller 470 is disabled. From cycle ten onwards, data may be removed from the output data multiplexer 440.

Returning particularly to FIG. 6, if a LOG function is to be accomplished, the bits in register 72 are to be preprocessed in section A or B of the data pre-shift mux 420 depending on whether the a logic "1" is found in bits eight through fourteen of the data. This information is always available to the controller 470, as while the bits are in register 72, bits eight though fourteen are logically ORed at OR gate 478. The output of gate 478 is sent as a control input MSB7 into controller 470. If a "1" is found in bits seven trough fourteen, the fifteen bits occupying positions 0–14 pass through section A of pre-shift multiplexer 420, where bits fifteen and zero are set to zero, and bits 1–14 are kept intact. Also, the output of the zero detector 478 is used as the most significant exponent bit of the LOG function and is set to "1" as bit A10 of the output multiplexer 440 section A. This is in accord with the LOG algorithm where the value of the four bit exponent must be eight (binary 1000) or greater if a "1" is located in bits 8–14. With bits 1–14 intact in the shift register, the register may be shifted left each clock cycle as long as the shift enable control signal to the controller 470 permits. Before the first shift left occurs, the bit occupying the msb position in the shift register 472 is read, and since bit fifteen was preset to zero, the shift enable input into controller 470 remains active. At the end of the cycle, the down counter 474 is decremented from its initial value of seven to six. As the first shift left occurs, the bit originally in the fourteenth bit position moves into the fifteenth bit position (msb) of the shift register 472. If that bit is a "1", AND gate 482 goes high because during a LOG function, the antilog enable control is high. With AND gate 482 high, OR gate 484 goes high, thereby informing the controller 470 via a high shift enable feedback that shifting should not continue. At the same time, the decrementing of the down counter 474 is disabled such that the value of six is maintained. With down counter 474 having a value of six, three bits corresponding to a value "110" would be at the output of the counter 474. These three bits would join the "1" bit which was output at zero detector 478 to form a digital exponent of "1110"; or "14" in decimal notation. It is clear that the maximum LOG exponent would be "14", as the left-most logic "1" which was used for computing the LOG value was in the $2^{14}$ bit position. Hence, the fifteenth bit was preprocessed in the data pre-shift multiplexer 420 to be a zero so that down counter 474 would be counted down by one so that the maximum exponent value of fourteen would be obtained.

If the fourteenth bit was not a "1", it would be appreciated that the procedure of shifting and down counting would continue until a "1" occupied the msb of the shift register 472. At that point, the down counter value expressed digitally would be combined with the zero detector 478 output to provide the four bits representing the LOG exponent. Also, the bits then occupying the fourteenth through eighth bit positions of the shift register output would comprise the mantissa of the LOG value, as the mantissa as previously defined is taken as the seven bits following the left-most "1" value. Thus, as seen in section A of output multiplexer 440, the fourteenth through eighth bits of the shift register 472 are inserted into bit positions A6 through A0, and the complete LOG value is provided. By convention, the LOG value is expressed with sixteen bits: bits fifteen through eleven being set to zero; bits ten through seven being the exponent and bits six through zero being the mantissa.

If the original sixteen bit word which is to be expressed as a LOG does not have a "1" value in bit positions fourteen through eight, the zero detector 478 would register a "0". That result would cause a zero to be located at bit A10 (the msb of the exponent) of the output multiplexer 440, and would also be sent to the controller 470 via the MSB7 control signal. The controller in turn would cause selects IS1 and IS0 to select the B section of the pre-shift multiplexer 420 to preprocess the word in register 72. Thus, the bits occupying bit locations seven through zero would be input into positions fifteen through eight of the shift register 472, and bit positions seven through zero would be set to values of zero. When the msb of the shift register 472 was read, if it was a "1", the active low shift enable signal would be set high via AND gate 482 and OR gate 484 and the down counter 474 would be disabled. Thus, the down counter would read "111" (seven in decimal) as the original word had a "1" value in its seventh bit position. Because the msb of the exponent was already set to zero, the proper value would be obtained. The three bits from the counter 474 would then be entered as exponent bits A9 through A7 in the output multiplexer 440 as previously described, and the seven bit mantissa would also be obtained as previously described. It should be noted however, that when a preshifting of eight bits was provided by the pre-shift mux 420, the seven bit mantissa necessarily includes at least one zero which was not part of the original sixteen bit word but which was supplied by the pre-shift mux itself.

If the msb in the shift register 472 was a "0", rather than a "1", the down counter would be decremented at the end of the clock cycle, and the shift register would shift left. The sixth bit which was originally inserted into the fourteenth bit slot of the shift register 472 would then occupy the msb location and would be read as previously described. If it was also a "0", the process would continue with the fifth bit, the fourth bit . . . until the down counter reached a value of zero. At that point, zero detector 486 would go high, forcing OR gate 484 to go high and causing the shift enable signal to signal the controller 470 to go high and disable further shifting. An exponent value of 0000 and a mantissa value of 0000000 would properly result, as the original word had a zero value.

It will be appreciated that much of the circuitry provided for accomplishing the LOG function is used in carrying out the FLOAT function as afore-defined. Thus, with the FLOAT function, the seven bits occupying bit locations fourteen through eight are logically ORed at 478 so that a control signal MSB7 can be sent to the controller 470 to help the controller determine whether the sixteen bit word held in register 72 should be preprocessed by section A or section B of the pre-shift multiplexer 420. It will be appreciated that the preprocessing of LOG and FLOAT functions is identical, as is the manner of shifting the shift register 472 and decrementing the down counter 474. The primary difference between the LOG and FLOAT functions is that as afore-stated, the exponent for the FLOAT function must be one greater than that of the LOG function. Thus, the msb of the exponent coming from zero detector 478, as well as the remaining three bits coming from down counter 474 are sent to an incrementer 476, where the command to increment is the msb from shift register 472. When the value of the msb of shift register 472 is a "1", a value one is added to the four exponent bits. However, in keeping with the definition for the FLOAT function, the exponent is not incremented if the msb of the shift register 472 is a "0". The FLOAT exponent is then sent to section B of the output multiplexer as bits nine through six. The six bit mantissa which is defined as the left-most "1" value bit in the sixteen bit word and the five bits following that bit is derived either by reading bits fifteen through eleven in the shift register 472 or equivalently by reading bits fourteen through eleven of the shift register 472 and setting the msb of the mantissa to a value of "1". Regardless, the six bit mantissa is placed as bits five through zero in the B section of the output multiplexer 440. It should also be noted, that if the value of the original sixteen bit word is zero, the four bit FLOAT exponent will always properly be zero (0000) in accord with the previously described algorithm, as a "1" is not seen at the msb of the shift register 472.

Where an ANTILOG function is to be performed, the word in register 72 is a LOG value with a four bit exponent and a seven bit mantissa. In accord with the provided circuitry, the msb of the four bit exponent (in position ten of register 72) is read by controller 470 at control input E3 to determine whether the word should be preprocessed through Section C or Section D of pre-shift multiplexer 420; the former being used where the exponent msb is a "1", and the latter where it is a "0". Thus, if the exponent msb is a "1", the mantissa occupying bits positions six through zero of Register D 72 are preprocessed by the pre-shift multiplexer 420 to be located in bit positions fourteen through eight of the shift register 472, with bits seven through zero being set to "0" as the value of the exponent dictates that the mantissa is higher than or equal to $2_8$. If the exponent msb is a "0", the mantissa is preprocessed to be located in bit positions six through zero of shift register 472 because the value of the exponent dictates that the mantissa is less than $2^8$. Regardless, in both situations, in accord with the ANTILOG algorithm a bit of the value "1", is inserted in the bit position one higher than the msb of the mantissa. Thus, the pre-shift multiplexer 420 causes bit location fifteen or seven to be set to a value of "1" depending on whether preprocessing was through section C or D of the pre-shift mux 420.

While the msb of the exponent determines the manner in which the mantissa is preprocessed, the remaining three bits help determine the number of shifts needed. Clearly, if the exponent was "1110", which would have been the highest number allowable as bit position fifteen is reserved for the sign bit, the mantissa which has had a "1" placed in front of it in bit position fifteen of the shift register 472 requires one shift ("001" binary) to be located properly as the first "1" should be located in bit position fourteen. On the other hand, if the exponent was "1000", the first "1" should occur in bit position eight. Thus, the register 472 should be shifted right seven times ("111" binary). In other words, the register 472 should be shifted right by the value of the inverted remaining three bits of the exponent. Thus, an inverter 492 is provided for inverting the three remaining bits of the exponent. Provided the ANTILOG function is being carried out and not the LOG or FLOAT function, these three inverted bits are used to set down counter 474. The shift register 472 is then shifted right until the down counter reaches a value of zero thereby disabling the shifter. As the shift register shifts right, zeroes are inserted into the msb's of the word located in the shift register. The ANTILOG value is then drawn entirely from the bits fourteen through zero located in the (bidirectional) shift register 472.

Figure 8B:
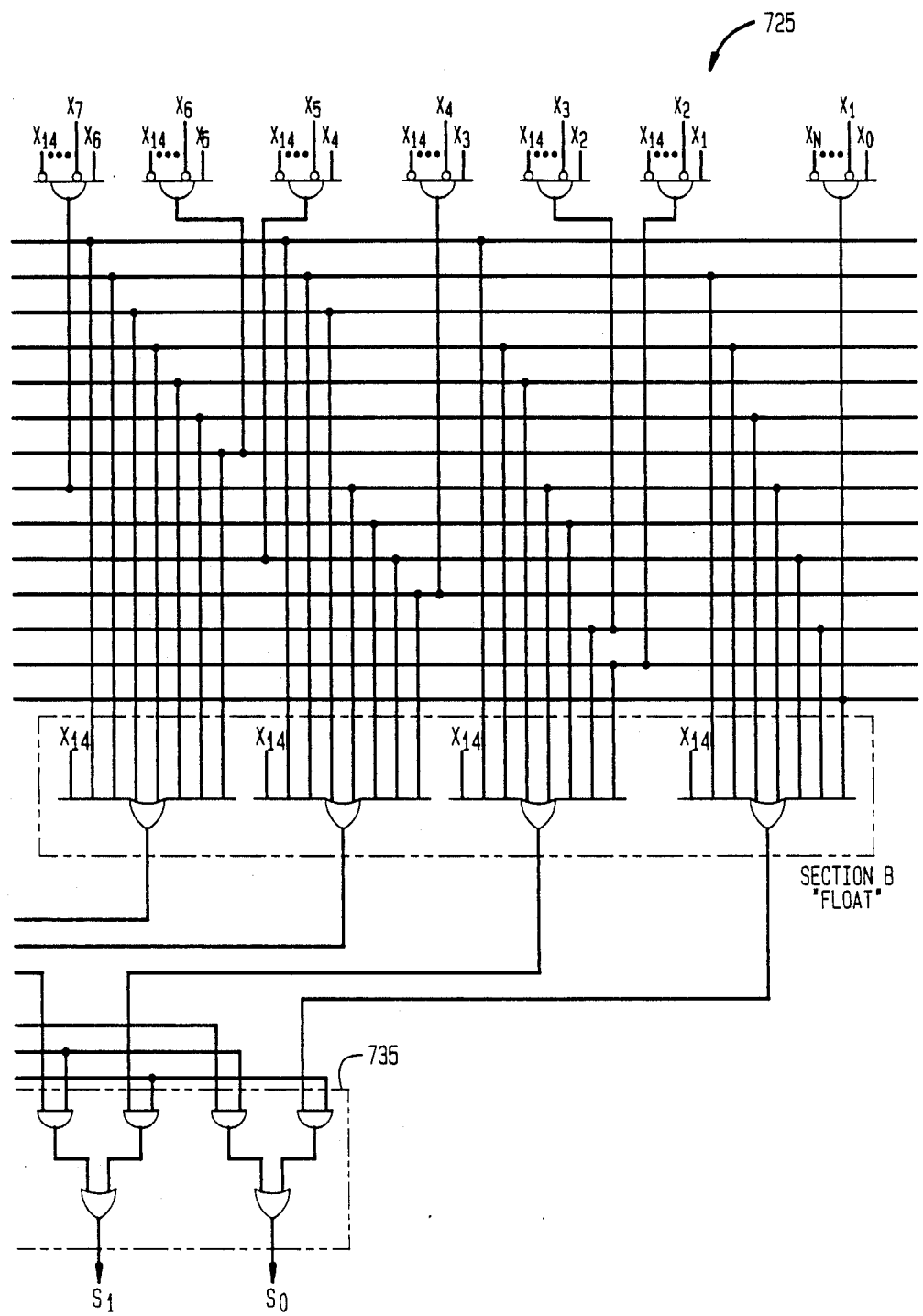
FIG. 8 shows the interconnection of FIGS. 8A–8C, which are a logic diagram of an alternative embodiment shifter for the first common means of FIG. 5.
Figure 8C:
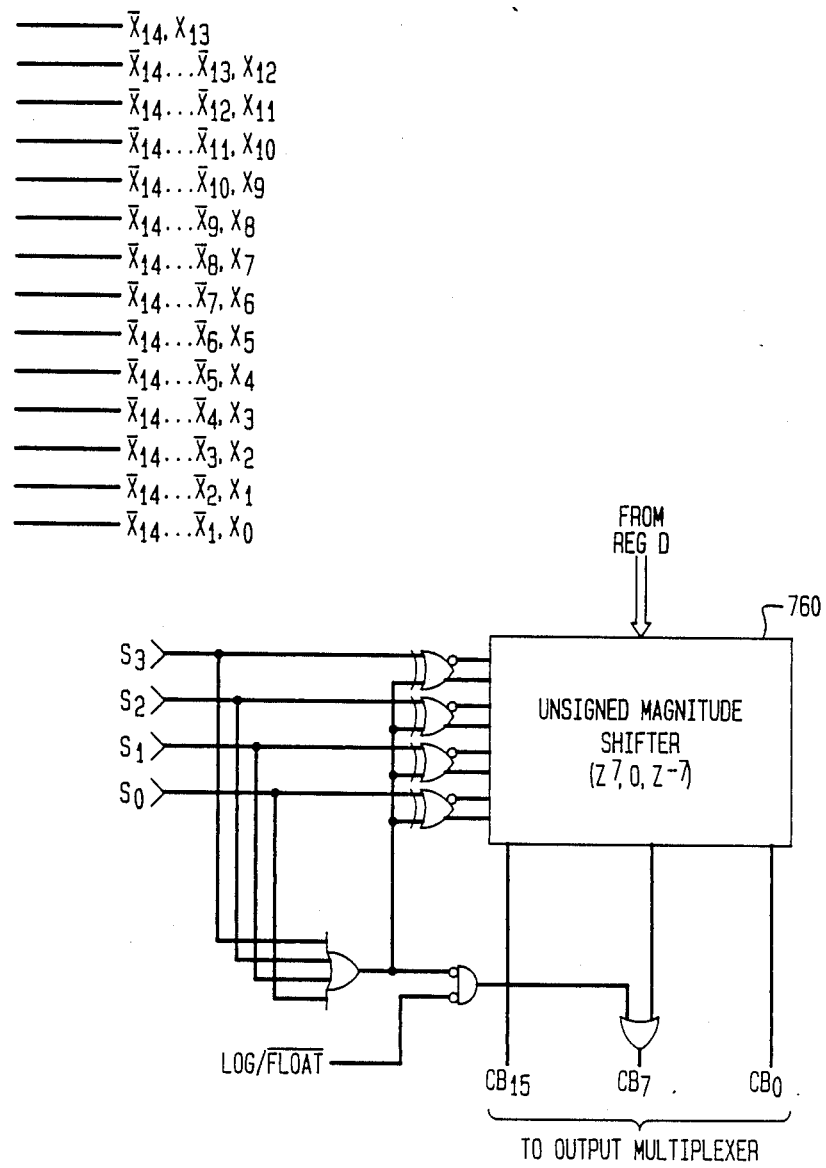

While the circuitry of FIG. 6 is one manner of shifting bits to find the exponent for the LOG and FLOAT operations, it will be appreciated that other means may also be provided. Thus, as seen in FIG. 8, a flash converter 720 utilizes a majority logic encoder 725 to search for the position of the most significant logic bit having a value of one. While the encoder 725 contains numerous AND and OR gates, it is capable of performing its function in a time of on the order of one clock cycle (100 ns). The encoder shown in FIG. 8 contains separate logic sections for the LOG and FLOAT functions as the required exponent of the FLOAT operation is one greater than that of the LOG operation, unless the exponent is zero. Thus, inputs to section A are required to provide the LOG output, while the FLOAT is accomplished by section B of FIG. 8. A logic controller 730 is provided to permit the outputs of section A or B to be processed through AND gate array 735, and the proper exponent is received as bits S3-S0.

In order to obtain the mantissa for the LOG or FLOAT operations for the flash converter 720, the sixteen bit word N is received by a shifter 760 which shifts the word according to the value of the exponent S3-S0. Thus, for a LOG operation, the mantissa is obtained by shifting the word N by the difference of sixteen and the value of the exponent S3-S0. For the FLOAT operation, on the other hand, the word N is shifted by the difference of fifteen and the value of exponent S3-S0.

Those skilled in the art will appreciate that a flash technique could also be used to implement the ANTILOG function. The magnitude shifter 760 would be used to properly locate the bits in the resulting sixteen bit word.

It will be appreciated that however the LOG, FLOAT and ANTILOG functions are carried out, according to the invention common means are provided so that the similarities of the functions may be exploited. Typically, the common means for performing the LOG, FLOAT and ANTILOG functions will include a shifter of some type, logic circuitry in conjunction with the shifter to accomplish the different functions before and/or after shifting, and a control means for directing the logic means and/or shifter.

Figure 9A:
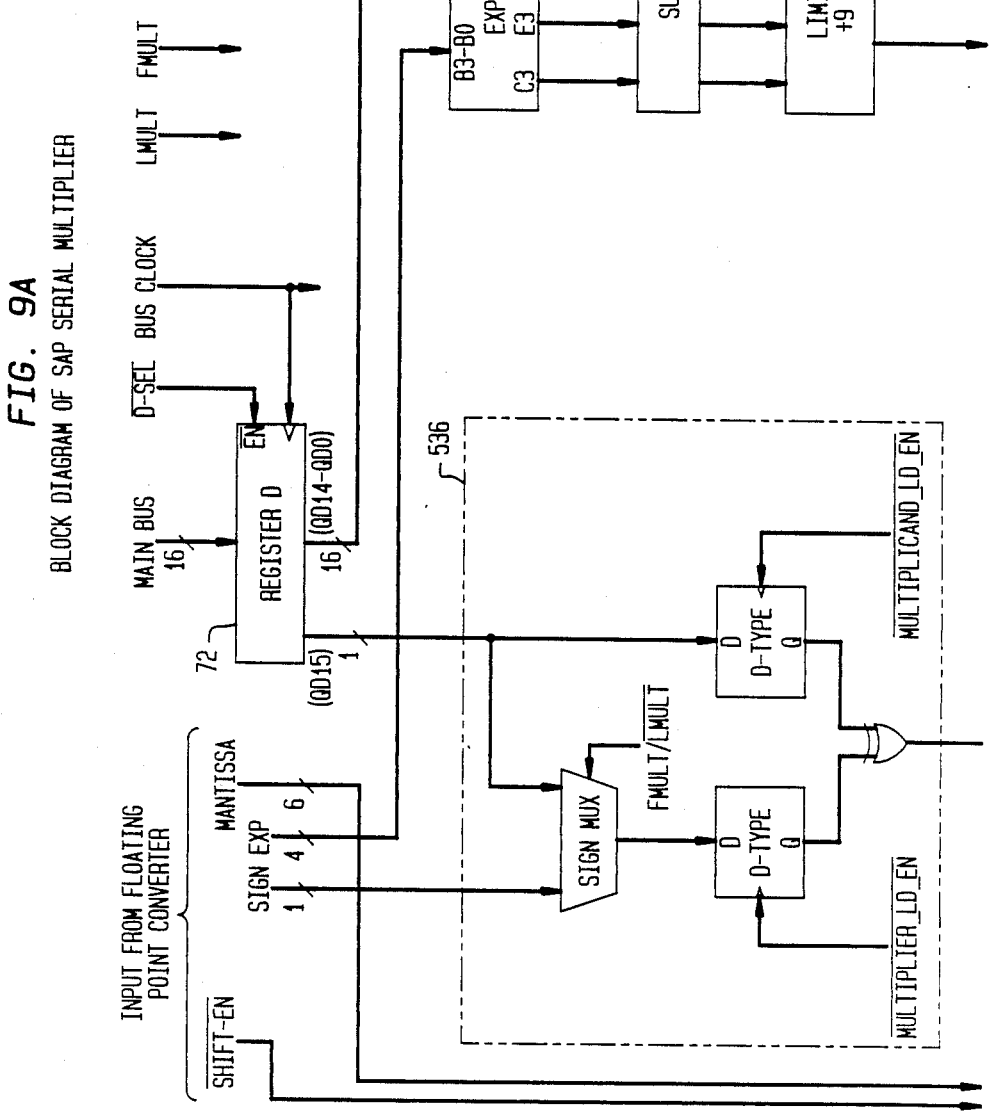
FIG. 9 is a block diagram of the second common means of the serial arithmetic processor of FIG. 5.
Figure 9B:
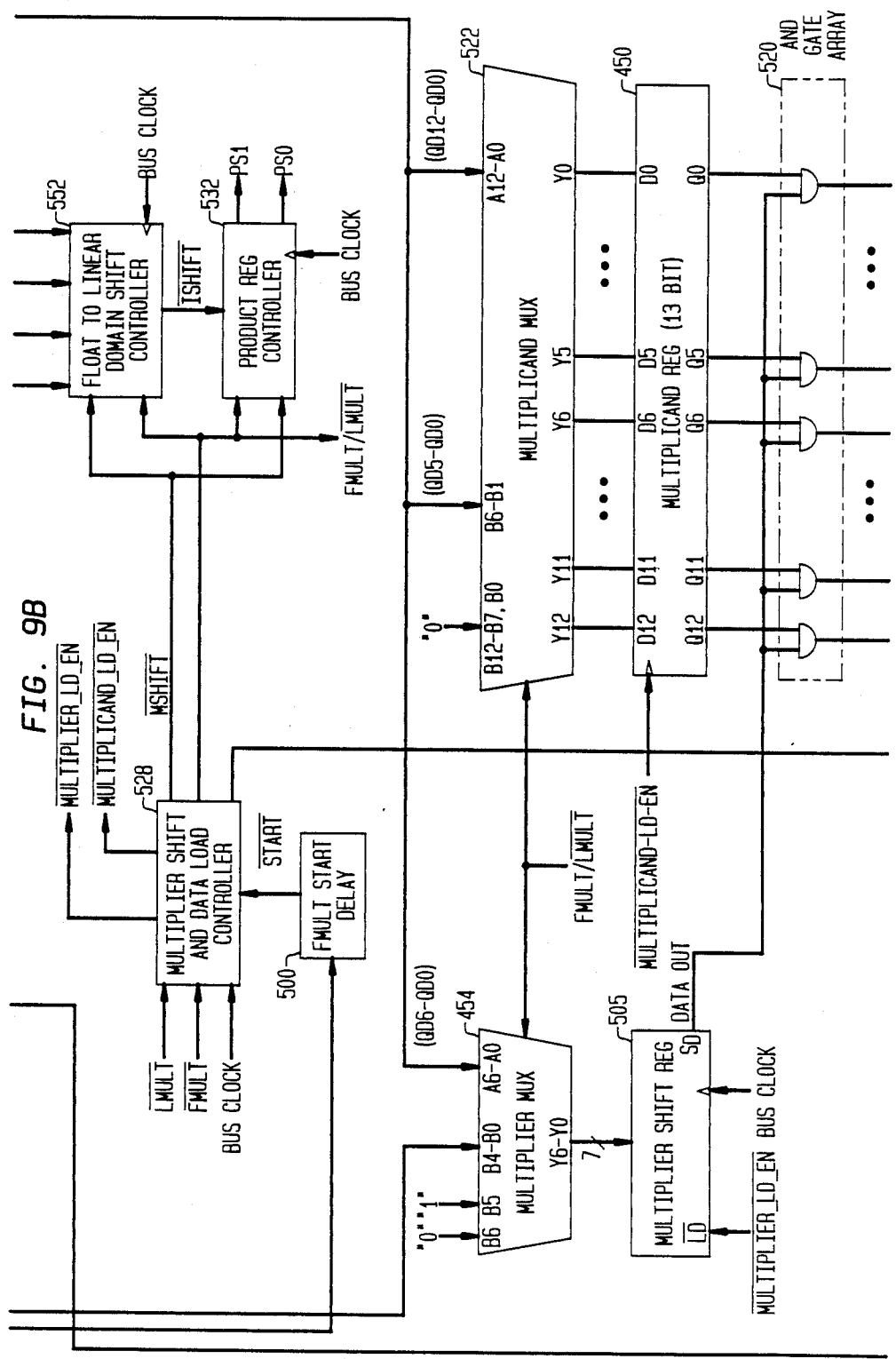
Figure 9C:
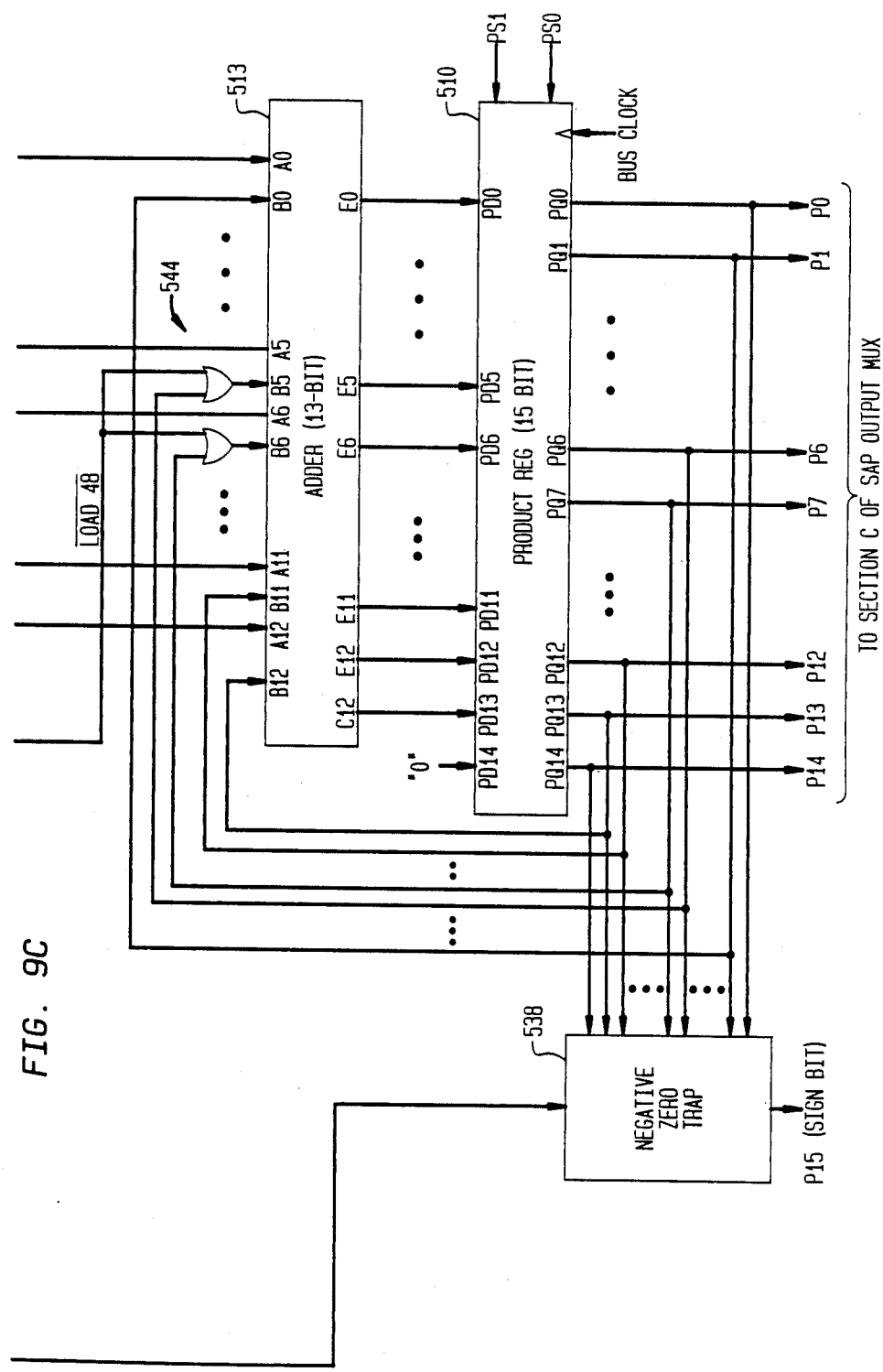

Before turning to FIG. 9, a review of the MULTIPLICATION and FLOATING POINT MULTIPLICATION algorithms which are implemented by the second common means is in order. In the MULTIPLICATION algorithm of ADPCM, an eight bit signed magnitude multiplier and a fourteen bit signed magnitude multiplicand are preferably multiplied according to a well known add and right shift technique (although parallel multiplication could be used), where a decision is made either to add the multiplicand to a partial product or to add zero depending upon whether the multiplier digit under consideration is a "1" or a "0". (See, e.g. Hayes, J. P. "Computer Architecture and Organization", *Computer Science Series,* McGraw Hill (1978, pp. 88-90). In multiplying two digital numbers, the number of resulting bits equals the sum of the length of each number. Thus, because in effect the MULTIPLICATION algorithm multiplies a seven bit magnitude word by a thirteen bit magnitude word, a twenty bit product results. According to the algorithm, the six least significant bits are truncated from the twenty bit word to provide a fourteen bit product, and the sign bit is attached thereto.

While the signed magnitude MULTIPLICATION algorithm is very straight-forward, the FLOATING POINT MULTIPLICATION algorithm is more intricate. Thus, a four bit exponent by six bit mantissa multiplicand is multiplied by an identically arranged multiplier, and the floating point product is then converted into a signed magnitude format. The algorithm for accomplishing the same is as follows:

SIGN = SIGN (MULTIPLIER) XOR SIGN (MULTIPLICAND)

EXP = EXP (MULTIPLIER) + EXP (MULTIPLICAND)

MANT = [(MANT (MULTIPLIER) × MANT (MULTIPLICAND) + 48) >> 4]

where the value in [ ] is >>(19−EXP) if EXP <=26 or the value in [ ] is <<(EXP−19) & 32767 if EXP>26

A second common means 460 for carrying out the signed magnitude MULTIPLICATION and the FLOATING POINT MULTIPLICATION is seen in FIG. 9, and basically comprises a multiplicand register 450, a multiplier register 505 capable of being shifted, a shiftable partial product register 510 for holding the partial product and for providing a shifted final product, an adder 515 for adding the multiplicand to the partial product, and a gating means 520 for controlling the addition of either the multiplicand or zero with the partial product depending on the multiplier digit under consideration.

Figure 10A:
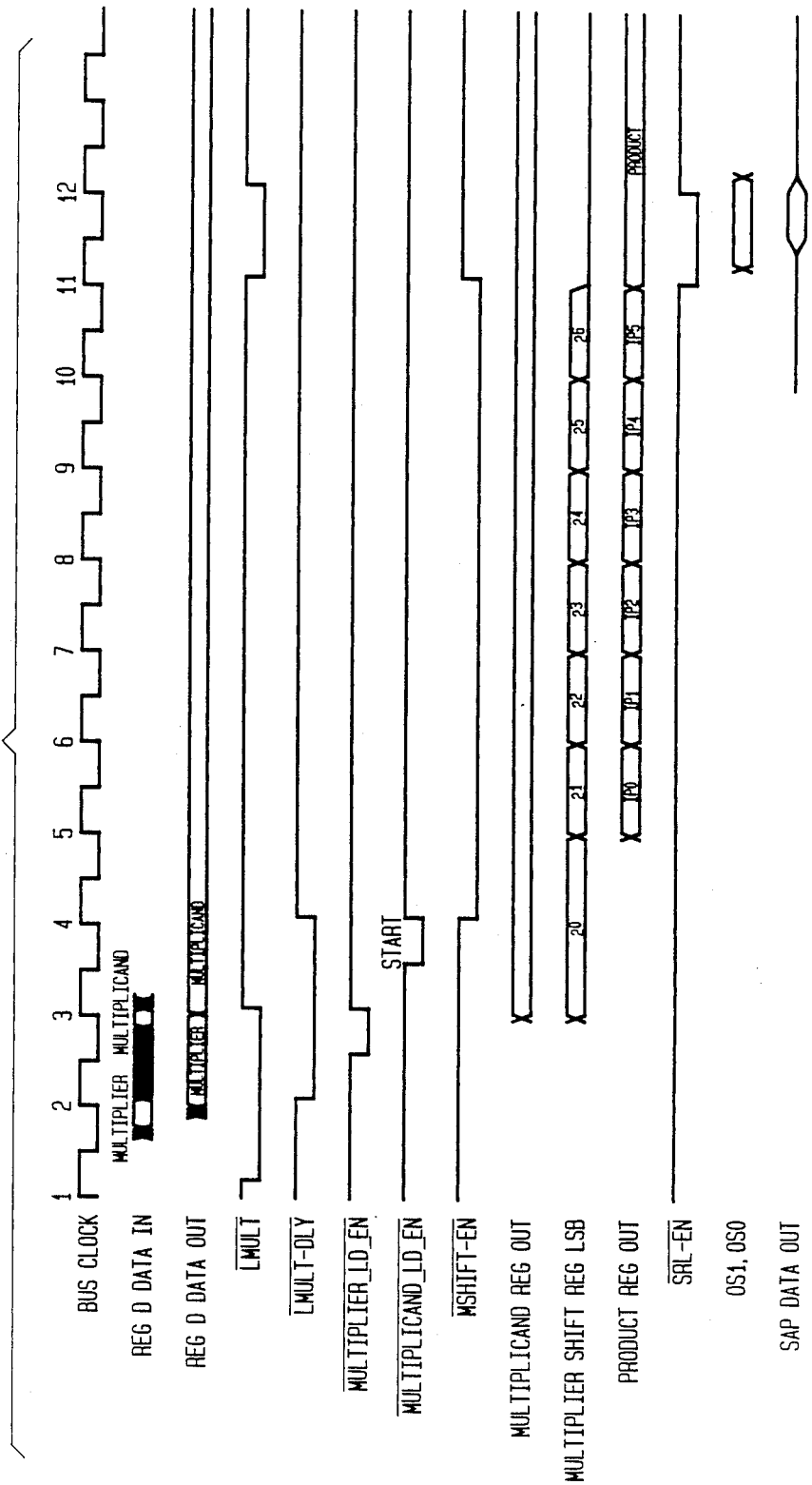
FIG. 10a is a timing diagram for the second common means of FIG. 9 for carrying out an eight by fourteen bit signed magnitude multiplication.

In accord with the detailed circuitry of FIG. 9, the timing diagram of FIG. 10a, and the ADPCM algorithm, in performing a MULTIPLICATION a seven bit magnitude taken as the multiplier is read from Register D 72 and loaded via section A of the multiplier select multiplexer 454 into the multiplier register 505 under the control of the active low multiplier load enable signal (MULTIPLIER-LD-EN). At another point in time, a thirteen bit magnitude taken as the multiplicand is read from register 72 and loaded via section A of the multiplicand select multiplexer 522 into the multiplicand register 500 under the control of the active low multiplicand load enable signal (MULTIPLICAND-LD-EN). The multiplier and multiplicand are processed separately. The control signals MULTIPLIER-LD-EN and MULTIPLICAND-LD-EN are derived as a result of the external active low LMULT signal applied while register 72 was being loaded or at some other time. The first presentation of the LMULT signal causes MULTIPLIER-LD-EN to be generated while the second presentation causes MULTIPLICAND-LD-EN to be generated. The act of reading the partial product register 510 ensures that the presentation of LMULT will generate the proper signal and eliminates the possibility of the control signals being out of sequence.

The control signals MULTIPLIER-LD-EN and MULTIPLICAND-LD-EN are both generated from a delayed version of the LMULT signal which is called LMULT-DLY and which occurs one clock cycle after LMULT to ensure that data read from register 72 has settled. The multiplication process is initiated by the rising edge of the MULTIPLICAND-LD-EN signal which in turn generates an active low shift enable signal called MSHIFT-EN which controls the updating of the partial product register 510 via the product register controller 532.

Initially, the partial product register 510 is set to zero. At a clock cycle, the least significant bit of the multiplier in multiplier register 505 is read along with the bits in the multiplicand register 450 by AND gates 520. If the least significant bit of the multiplier is a "0", clearly, all the bits entering adder 515 will be "0" because regardless of the value of the bits in the multiplicand register 450, the AND gates 520 will only go high if both inputs are high. On the other hand, if the lsb of the multiplier is a "1", it will be appreciated that the the AND gates 520 will provide the identical value stored in the multiplicand register 450. Regardless, the value exiting the AND gates 520 is added in adder 515 to the value of bits located in the partial product register 510. A "shift right" is accomplished by requiring that the bit added to the n'th bit exiting the n'th AND gate 520 is added to the n+1'th bit of the partial product register.

On the next clock cycle, the bits in the multiplier register 505 are shifted such that the second lsb now occupies the lsb bit position. As before, the value of the now lsb is ANDed at 520 with the multiplicand, and the resulting values are sent to adder 515. At adder 515, the new set of bit values are added to the partial product contained in the partial product shift register 510. Of course, again the n'th bit from AND gates 520 is added to the n+1'th bit from the register 510, with the fourteenth bit (PD13) of the product register being determined according to any "carry" necessary by the bits in the thirteenth bit positions. This course is repeated six times until the seventh bit is read from the multiplier register 505 and processed. The procedure is then stopped by the control signal MSHIFT going high which results in new signals from the product register controller 532. The control signals PS1 and PS0 from the controller 532 tell the product register 510 to hold the partial product as a final product.

It will be appreciated, as stated above, that causing the n+1'th bit of partial product register 510 to be added to the n'th bit of the multiplicand register automatically causes a right shift to occur. It will also be appreciated that the least significant six partial product bits shifted to the right are not retained in the partial product register, and that only a truncated product of fourteen bits will occupy bit positions thirteen through zero of the partial product register. This is in accord with the ADPCM algorithm which requires such a truncated fourteen bit product. In addition, a fifteenth bit of the partial product register will be of a value zero since the input to the register is set to the zero value. Further, a sixteenth bit, the sign bit, is determined by taking the sign bits of the multiplicand and the multiplier, and performing an exclusive OR (XOR) logic operation on them as seen at 536. The result is then sent through a negative zero trap 538 where a check is made to guarantee that a sign bit indicative of the negative and a word of all zeroes is not output because such an output would be indicative of a maximum negative value in two's complement when a conversion from signed magnitude to the two's complement is undertaken using the CYT microinstruction of the MIS and PALU. Thus, the negative zero trap 538 switches the sign bit to a positive value for zero in such a case. The sign bit output of the negative zero trap 538 and the fifteen bit output of the bidirectional partial product shift register 510 are then sent as a sixteen bit word to the output multiplexer 440 of FIGS. 5 and 6 such that the result may be directed to a desired location.

In performing a FLOATING POINT MULTIPLICATION, the multiplier and multiplicand must be in floating point format prior to the multiplication. In the ADPCM algorithm, the floating point multiplicand is used a number of times, and therefore the floating point value for the multiplicand is stored in RAM for use when needed. Because the multiplier value is typically changing (as opposed to the multiplicand), the multiplier is not stored as a floating point value. Thus, prior to a FLOATING POINT MULTIPLICATION, the signed magnitude format multiplier must be converted into a floating point representation. Thus, in accord with the afore-described FLOAT operation, the value is so converted. While the multiplier is being converted into floating point representation, the floating point multiplicand may be loaded into Register D and then loaded into multiplicand register 450 via section B of the multiplicand select multiplexer 522. Section B receives the six bit mantissa of the floating point multiplicand (located in bit positions five through zero of the sixteen bit word) and locates them in bit positions six through one. The four bit exponent of the multiplicand (in bit positions nine through six) are sent to adder 542, and the sign bit (bit position fifteen) is sent to sign calculator 536.

Because the floating point multiplier might not be available when the multiplicand is loaded into the second common means, it is necessary to provide a delay before starting the multiplication process. The delay is provided by a FMULT delay controller 500, which generates a START signal when it detects that the SHIFT-EN signal controlling shift register 472 of FIG. 6 has gone high (i.e. the FLOAT operation of the first common means has been completed). The START signal in turn enables the MSHIFT-EN signal which starts the multiplication process. The multiplication process is permitted, because when the FLOAT operation is terminated, the floating point multiplier value is transferred from the shift register 472 of the first common means to the multiplier register 505 of the second common means via section B of the multiplier select multiplexer 454. Thus, the bits in bit positions fourteen through ten of the shift register 472 are placed in bit positions four through zero of the multiplier register 505 where bit position five is set to a logic "1" as the msb of the mantissa of a floating point representation is always a one as previously described. Bit position six in the multiplier register 505 is set to zero. In a similar manner, the four bit floating point multiplier exponent and the sign bit are received from the first common means of FIG. 6 and are respectively sent to the adder 542 and the sign calculation means 536, where a determination of the product and sign is had.

In the multiplication process, the mantissas as loaded in the multiplier register 505 and multiplicand register 450 may be multiplied by using AND gates 520, adder 515 and the bidirectional partial product shift register 510 as afore-described with reference to the signed magnitude MULTIPLICATION function. It will be noted that in accord with the ADPCM algorithm, the value of forty-eight (110000 in binary) is added to the partial product by initially presetting bit locations five and six of the adder 515 equal to one and adding them to the value proceeding through AND gates 520. In this regard, OR gates 544 are used to load the forty-eight value into the adder 515 under the control of a Load-48 control signal.

Once the multiplication of the mantissas and the addition of the value forty-eight have taken place, a twelve bit product is situated in bit locations PQ1 through PQ12 of the partial product register 510. Then, according to the ADPCM algorithm, the product must be converted to a linear domain representation by shifting the mantissa product as afore-described. Thus, the exponents of the floating point represented words are added at adder 542. The value nineteen is then subtracted from the value of the exponent sum at 546. The resulting value is then limited at limiter 548 to at most a value of nine and at least a value of minus eight. The value in register 548 is then used to control via controller 532 he direction of shifting of the partial product register 510, and via shift duration controller 552 the number of shifts of the bidirectional partial product shift register 510. As is indicated in FIG. 9 at duration controller 552 and in FIG. 10, the duration controller 552 outputs a control ISHIFT which uses the value of limiter 548 to shift the partial product register 510 (i.e. the duration of ISHIFT=EXP(MULTIPLICAND)+EXP(MULTIPLIER)−19, such that −9<ISHIFT<10, with the sign of the added exponents determining the direction of shift; a positive value indicating a left shift and a negative value indicating a right shift). The thus-shifted linear product value is then subjected to a logical AND operation with the decimal value 32767 (0111111111111111 in binary) as required by the ADPCM algorithm by limiting the length of the partial product register 510 to fifteen bits. Thus, the values that could occupy bit positions fifteen and sixteen given a maximum right shift are negated (by being lost, i.e. shifted out of the register) and the values located in bit positions fourteen through zero are retained. The sign bit is meanwhile determined via circuitry 536 in the same manner as the signed magnitude MULTIPLICATION sign bit, and is processed through negative zero trap 538 to provide the sign bit. As was the case with the MULTIPLICATION function, the sign bit output of the negative zero trap 538 and the fourteen bit output of the bidirectional partial product shift register 210 are sent as a sixteen bit word to the output multiplexer 440 of FIGS. 5 and 6 such that the result may be directed to a desired location.

Those skilled in the art will recognize that the second common means which performs the MULTIPLICATION and FLOATING POINT MULTIPLICATION functions is able, if desired, to operate concurrently with the first common means which performs the LOG, FLOAT and ANTILOG function. In particular, in conducting the FLOATING POINT MULTIPLICATION, a multiplier value may be converted to a floating point format by the FLOAT function while the multiplicand is being loaded into the multiplicand register. In this manner, an efficient implementation of the PREDICTOR of the ADPCM algorithm may be had as the FLOAT and FLOATING POINT MULTIPLICATION operations are interleaved. It will also be appreciated that the second common means is efficient in that the FLOATING POINT MULTIPLICATION and signed magnitude MULTIPLICATION functions use much common circuitry in their execution.

There has been described and illustrated herein a serial processor capable of conducting various ADPCM functions, including LOG, ANTILOG, FLOAT, MULTIPLICATION, and FLOATING POINT MULTIPLICATION. While particularly circuitry has been set forth and described, it will be appreciated that various other means for accomplishing the same will be within the grasp of those skilled in the art. For example, while the second common means of the invention was described in terms of a signed magnitude multiplication, the multiplier and multiplicand could be in two's complement form, and the appropriate circuitry could be provided to carry out the multiplications. Thus, it should be appreciated that the thrust of the invention is the understanding that at least large portions of the LOG, ANTILOG, and FLOAT functions can all be performed using common circuitry (first common means), and that large portions of the MULTIPLICATION and FLOATING POINT MULTIPLICATION functions can also be performed using common circuitry (second common means). While another aspect of the invention is that the first common means and the second common means may be processing information in parallel, particularly where a FLOATING POINT MULTIPLICATION is to be accomplished, it will be appreciated that other arrangements might negate the benefits of such an arrangement. For example, if a flash converter were used to perform the LOG and FLOAT functions such that the functions could be accomplished in just a few clock cycles rather than the ten required by the arrangement provided, it will be appreciated that a flash converter could be located at the output of register 15. Thus, the first common means could be located in a sequential manner rather than in a parallel manner with the second common means, such that the first common means would be accessible as required, and bypassed when desired. Controls would be used to send the output of the first common means to a desired location such that for the FLOAT, LOG, and ANTILOG functions, the output would be sent to output multiplexer 120, except where the FLOAT function was being utilized as part of a FLOATING POINT MULTIPLICATION. In that situation, the output of the first common means would be sent to the multiplier register 205 as well as the adder 242. Likewise, if a LINEAR MULTIPLICATION function was to be accomplished, or if a floating point value of the multiplicand was to be loaded, the first common means would be bypassed and the information from register 15 would be directed to the second common means. Therefore, it will be apparent to those skilled in the art that other changes and modifications may be made to the invention as described in the specification without departing from the spirit and scope of the invention as so claimed.

I claim:

1. A serial arithmetic processor for performing arithmetically complex functions on incoming data values, comprising:

(a) first common means for converting an incoming linear domain data value into its logarithmic domain data value equivalent, for converting an incoming linear domain data value into its floating point domain data value equivalent, and for converting an incoming logarithmic domain data value into its linear domain data value equivalent, said first common means including controlled first logic and circuit means;

(b) second common means for multiplying two incoming data values and providing a data product and for multiplying two floating point values and providing a data product, said second common means including controlled second logic and circuit means;

(c) output means for receiving data converted by said first common means and products of said second common means, and or sending the received data and products in a desired format to a desired destination; and (d) controller means for controlling said controlled first and second logic and circuit means, and said output means as a function of the desired conversion or multiplication to be performed on said incoming data.

2. A serial arithmetic processor according to claim 1, further comprising:

(e) means for connecting the output of said first common means to said second common means to permit an incoming data value which was converted into its floating point equivalent by said first common means to be multiplied in said second common means, wherein said controller means further controls said means for connecting.

3. A serial arithmetic processor according to claim 1, wherein:

said controlled logic and circuit means of said first common means includes at least a shifting means for shifting bits located therein, and logic means for finding the location of a left-most bit other than a sign bit having a value of one, said logic means providing signals to said controller means for controlling said shifting means.

4. A serial arithmetic processor according to claim 3, wherein:

said shifting means comprises a bidirectional shift register, and said logic means for controlling said bidirectional shift register includes a means for reading the most significant bit of said bidirectional shift register to determine the value of the most significant bit, and means for signalling the controller means as to the value of the most significant bit, wherein said controller causes said bidirectional shift register to shift according to the value of the of the most significant bit.

5. A serial arithmetic processor according to claim 4, wherein:

said logic means for controlling said bidirectional shift register includes means for determining the value of at least the three least significant bits of the exponent of data values in a LOG format, means for signalling said controller means as to the value of at least the three least significant bits of said exponent, wherein said bidirectional shift register shifts bits in said bidirectional shift register according to the value of at least the three least significant bits of said exponent.

6. A serial arithmetic processor according to claim 5, wherein:

said controlled first logic and circuit means includes a preshift multiplexer for receiving data in linear domain and logarithm domain format and preshifting the bits of said received data based on the manner in which the data is to be converted, wherein said preshift multiplexer is controlled by said controller.

7. A serial arithmetic processor according to claim 6, wherein:

said controlled first logic and circuit means includes an output multiplexer for formatting at least the data received from said bidirectional shift register according to the manner in which the data is to be converted, wherein said output multiplexer is controlled by said controller.

8. A serial arithmetic processor according to claim 7, wherein:

said controlled logic and circuitry of said second common means includes a multiplicand register for storing a multiplicand, a multiplier shift register for storing and shifting the bits of a multiplier, a partial product register for storing a partial product, second logic means for performing AND functions on at least one bit from said multiplier shift register and said multiplicand bits in said multiplicand register, and an adder for adding the value of bits in the partial product register to the bits supplied by said second logic means.

9. A serial arithmetic processor according to claim 8, wherein:

said partial product register shifts the bits contained therein in either direction, and said controlled logic and circuitry of said second common means further includes means for adding exponents of a multiplier data value and a multiplicand data value to provide a sum, means for using said sum to control the shifting of said partial product register, and logic means for performing an XOR function on the sign bit of the multiplier and multiplicand to provide a sign bit for the product of the multiplier and multiplicand, wherein said output multiplexer formats the product accumulated in said partial product register.

10. A serial arithmetic processor according to claim 3, wherein:

said controlled logic and circuitry of said second common means includes a multiplicand register for storing a multiplicand, a multiplier shift register for storing and shifting the bits of a multiplier, a partial product register for storing a partial product, second logic means for performing AND functions on at least one bit from said multiplier shift register and said multiplicand bits in said multiplicand register, and an adder for adding the value of bits in the partial product register to the bits supplied by said second logic means.

11. A serial arithmetic processor according to claim 10, wherein:

said partial product register shifts the bits contained therein in either direction, and said controlled logic and circuitry of said second common means further includes means for adding exponents of a multiplier data value and a multiplicand data value to provide a sum, means for using said sum to control the shifting of said partial product register, and logic means for performing an XOR function on the sign bit of the multiplier and multiplicand to provide a sign bit for the product of the multiplier and multiplicand.

12. A serial arithmetic processor according to claim 1, wherein:

said controlled logic and circuit means of said first common means includes at least a magnitude shifter means for shifting bits, and logic means for finding a location of the left-most bit other than a sign bit having a value of one, wherein said logic means for finding the location of the left-most bit provides an input for controlling said magnitude shifter.

13. A serial arithmetic processor according to claim 12, wherein:

said logic means for finding the location of the left-most bit other that the sign bit having a value of one includes a majority logic encoder.

14. A serial arithmetic processor according to claim 13, wherein:

said controlled logic and circuitry of said second common means includes a multiplicand register for storing a multiplicand, a multiplier shift register for storing and shifting the bits of a multiplier, a partial product register for storing a partial product, second logic means for performing AND functions on at least one bit from said multiplier shift register and said multiplicand bits in said multiplicand register, and an adder for adding the value of bits in the partial product register to the bits supplied by said second logic means.

15. A serial arithmetic processor according to claim 14, wherein:

said partial product register shifts the bits contained therein in either direction, and said controlled logic and circuitry of said second common means further includes means for adding exponents of a multiplier data value and a multiplicand data value to provide a sum, means for using said sum to control the shifting of said partial product register, and logic means for performing an XOR function on the sign bit of the multiplier and multiplicand to provide a sign bit for the product of the multiplier and multiplicand.

16. A serial arithmetic processor according to claim 1, wherein:

said controlled logic and circuitry of said second common means includes a multiplicand register for storing a multiplicand, a multiplier shift register for storing and shifting the bits of a multiplier, a partial product register for storing a partial product, second logic means for performing AND functions on at least one bit from said multiplier shift register and said multiplicand bits in said multiplicand register, and an adder for adding the value of bits in the partial product register to the bits supplied by said second logic means, wherein signed magnitude data values are provided for said two incoming data values, and wherein a signed magnitude data product is provided from the data product of said two floating point values.

17. A serial arithmetic processor according to claim 16, wherein:

the bits from said partial product register are shifted one place to the right relative to said bits received by said adder from said second logic means, and said controllable logic and circuitry of said second common means further includes logic means for performing an XOR function on the sign bit of the multiplier and multiplicand to provide a sign bit for the product of the multiplier and multiplicand.

18. A serial arithmetic processor according to claim 17, wherein:

said partial product register shifts the bits contained therein in either direction, and said controlled logic and circuitry of said second common means further includes means for adding exponents of a multiplier data value and a multiplicand data value to provide a sum, and means for using said sum to control the shifting of said partial product register.

19. A serial arithmetic processor according to claim 18, wherein:

said controlled logic and circuit means of said second common means includes a multiplier preshift multiplexer and a multiplicand preshift multiplexer for preshifting the multiplier and multiplicand based on which of a signed magnitude multiplication and floating point multiplication is to be accomplished, wherein said multiplier and multiplicand preshift multiplexers are controlled by said controller.

* * * * *